United States Patent
Khlat et al.

(10) Patent No.: US 9,991,065 B2
(45) Date of Patent: Jun. 5, 2018

(54) CONTACT MEMS ARCHITECTURE FOR IMPROVED CYCLE COUNT AND HOT-SWITCHING AND ESD

(71) Applicant: Qorvo US, Inc., Greensboro, NC (US)

(72) Inventors: Nadim Khlat, Cugnaux (FR); Jonathan Hale Hammond, Oak Ridge, NC (US)

(73) Assignee: Qorvo US, Inc., Greensboro, NC (US)

(*) Notice: Subject to any disclaimer, the term of this patent is extended or adjusted under 35 U.S.C. 154(b) by 5 days.

(21) Appl. No.: 15/282,119

(22) Filed: Sep. 30, 2016

(65) Prior Publication Data

US 2017/0018378 A1    Jan. 19, 2017

Related U.S. Application Data

(62) Division of application No. 13/939,941, filed on Jul. 11, 2013.

(Continued)

(51) Int. Cl.
*H01H 9/54* (2006.01)
*H04B 1/44* (2006.01)
(Continued)

(52) U.S. Cl.
CPC .......... *H01H 9/548* (2013.01); *H01H 1/0036* (2013.01); *H01Q 1/50* (2013.01);
(Continued)

(58) Field of Classification Search
CPC ........ H01H 9/548; H01H 1/0036; H01B 1/44; H01Q 1/50; H01Q 21/0006
See application file for complete search history.

(56) References Cited

U.S. PATENT DOCUMENTS 4,498,057 A   2/1985  Noro
5,502,422 A   3/1996  Newell et al.
(Continued)

FOREIGN PATENT DOCUMENTS

CN    201374693 Y    12/2009

OTHER PUBLICATIONS

Author Unknown, "3rd Generation Partnership Project; Technical Specification Group Radio Access Network; Evolved Universal Terrestrial Radio Access (E-UTRA); User Equipment (UE) Radio Transmission and Reception (Release 11)," Technical Specification 36.101, Version 11.1.0, Jun. 2012, 3GPP Organizational Partners, 336 pages.

(Continued)

*Primary Examiner* — Dean Takaoka
*Assistant Examiner* — Alan Wong
(74) *Attorney, Agent, or Firm* — Withrow & Terranova, P.L.L.C.

(57) ABSTRACT

The disclosure is directed to optimized switching circuitry utilizing MEMS (Microelectromechanical Systems) circuitry in series with solid state circuitry. Specifically, the MEMS circuitry includes a first MEMS circuit in parallel with (and separate from) a second MEMS circuit. A paired signal is defined as a transmit signal and a receive signal (in a single band) that are transmitted or received on separate paths or on separate nodes. The transmit signal is associated with the first MEMS circuit, and the receive signal is associated with the second MEMS circuit. The solid state circuitry switches between the first MEMS circuit and second MEMS circuit without requiring any switching in the first or second MEMS circuits.

20 Claims, 16 Drawing Sheets

Related U.S. Application Data

(60) Provisional application No. 61/670,299, filed on Jul. 11, 2012.

(51) Int. Cl.
  *H01Q 21/00* (2006.01)
  *H01H 1/00* (2006.01)
  *H01Q 1/50* (2006.01)

(52) U.S. Cl.
  CPC .......... *H01Q 21/0006* (2013.01); *H04B 1/44* (2013.01); *Y10T 307/747* (2015.04)

(56) References Cited

U.S. PATENT DOCUMENTS

| | | | |
|---|---|---|---|
| 6,021,317 A | 2/2000 | Irvin | |
| 6,091,970 A | 7/2000 | Dean | |
| 6,128,474 A | 10/2000 | Kim et al. | |
| 6,405,018 B1 | 6/2002 | Reudink et al. | |
| 6,940,363 B2 * | 9/2005 | Zipper | H01H 1/0036 333/101 |
| 6,961,368 B2 | 11/2005 | Dent et al. | |
| 7,184,717 B2 * | 2/2007 | Rose | H04B 1/005 343/702 |
| 7,187,945 B2 | 3/2007 | Ranta et al. | |
| 7,212,788 B2 | 5/2007 | Weber et al. | |
| 7,251,499 B2 | 7/2007 | Ella et al. | |
| 7,289,080 B1 | 10/2007 | Bohlman | |
| 7,596,357 B2 | 9/2009 | Nakamata et al. | |
| 7,864,491 B1 | 1/2011 | Bauder et al. | |
| 7,872,547 B2 | 1/2011 | Song et al. | |
| 7,973,645 B1 | 7/2011 | Moretti et al. | |
| 7,996,003 B2 | 8/2011 | Maeda et al. | |
| 8,208,867 B2 | 6/2012 | Lum et al. | |
| 8,369,811 B2 | 2/2013 | Sultenfuss et al. | |
| 8,437,438 B2 | 5/2013 | Kuwahara | |
| 8,565,701 B2 | 10/2013 | Sanchez et al. | |
| 8,571,489 B2 | 10/2013 | Mikhemar et al. | |
| 8,634,029 B2 | 1/2014 | Pugel | |
| 8,718,582 B2 | 5/2014 | See et al. | |
| 8,774,065 B2 | 7/2014 | Khlat et al. | |
| 8,774,067 B2 | 7/2014 | Rousu et al. | |
| 8,942,644 B2 | 1/2015 | Schell | |
| 9,077,397 B2 * | 7/2015 | Soler Garrido | H04B 7/04 |
| 9,078,211 B2 | 7/2015 | Khlat | |
| 9,118,100 B2 | 8/2015 | Khlat | |
| 9,312,888 B2 | 4/2016 | Weissman et al. | |
| 2002/0101907 A1 | 8/2002 | Dent et al. | |
| 2005/0245202 A1 | 11/2005 | Ranta et al. | |
| 2005/0277387 A1 | 12/2005 | Kojima et al. | |
| 2006/0012425 A1 | 1/2006 | Ohnishi et al. | |
| 2006/0025171 A1 | 2/2006 | Ly et al. | |
| 2006/0079275 A1 | 4/2006 | Ella et al. | |
| 2006/0240785 A1 | 10/2006 | Fischer | |
| 2006/0264184 A1 | 11/2006 | Li et al. | |
| 2006/0276132 A1 | 12/2006 | Sheng-Fuh et al. | |
| 2006/0293005 A1 | 12/2006 | Hara et al. | |
| 2007/0002984 A1 | 1/2007 | Hoon | |
| 2007/0075803 A1 | 4/2007 | Kemmochi et al. | |
| 2007/0216481 A1 | 9/2007 | Jimenez et al. | |
| 2007/0280185 A1 | 12/2007 | McFarland et al. | |
| 2008/0003797 A1 | 1/2008 | Kim | |
| 2009/0180403 A1 | 7/2009 | Tudosoiu | |
| 2009/0285135 A1 | 11/2009 | Rousu et al. | |
| 2009/0286501 A1 | 11/2009 | Rousu et al. | |
| 2009/0303007 A1 | 12/2009 | Ryou et al. | |
| 2010/0079347 A1 | 4/2010 | Hayes et al. | |
| 2010/0099366 A1 | 4/2010 | Sugar et al. | |
| 2010/0157855 A1 | 6/2010 | Chu et al. | |
| 2010/0248660 A1 | 9/2010 | Bavisi et al. | |
| 2010/0291888 A1 | 12/2010 | Hadjichristos et al. | |
| 2010/0317297 A1 | 12/2010 | Kratochwil et al. | |
| 2011/0001877 A1 | 1/2011 | Pugel | |
| 2011/0069645 A1 | 3/2011 | Jones | |
| 2011/0105026 A1 | 5/2011 | Hsiao et al. | |
| 2011/0241782 A1 | 10/2011 | Clifton | |
| 2011/0241787 A1 | 10/2011 | Mastovich | |
| 2011/0250926 A1 | 10/2011 | Wietfeldt et al. | |
| 2012/0235735 A1 | 9/2012 | Spits et al. | |
| 2012/0275350 A1 | 11/2012 | Kwok | |
| 2012/0281597 A1 | 11/2012 | Khlat et al. | |
| 2013/0016633 A1 | 1/2013 | Lum et al. | |
| 2013/0122824 A1 | 5/2013 | Schell | |
| 2013/0230080 A1 | 9/2013 | Gudem et al. | |
| 2013/0320803 A1 | 12/2013 | Maeda | |
| 2013/0321095 A1 | 12/2013 | Lam et al. | |
| 2013/0336181 A1 | 12/2013 | Khlat et al. | |
| 2013/0337752 A1 | 12/2013 | Khlat | |
| 2013/0337754 A1 | 12/2013 | Khlat | |
| 2014/0015731 A1 | 1/2014 | Khlat et al. | |
| 2014/0024322 A1 | 1/2014 | Khlat | |
| 2014/0024329 A1 | 1/2014 | Khlat | |
| 2014/0035700 A1 | 2/2014 | Zeng et al. | |
| 2014/0038663 A1 | 2/2014 | George et al. | |
| 2014/0038675 A1 | 2/2014 | Khlat et al. | |
| 2014/0051372 A1 | 2/2014 | Shoshan et al. | |
| 2014/0073371 A1 | 3/2014 | Mujtaba et al. | |
| 2014/0092795 A1 | 4/2014 | Granger-Jones | |
| 2014/0105079 A1 | 4/2014 | Bengtsson et al. | |
| 2014/0106693 A1 | 4/2014 | Khlat | |
| 2014/0169243 A1 | 6/2014 | Khlat et al. | |
| 2014/0227982 A1 | 8/2014 | Granger-Jones et al. | |
| 2014/0329475 A1 | 11/2014 | Ella et al. | |
| 2014/0334362 A1 | 11/2014 | Granger-Jones | |
| 2015/0036563 A1 | 2/2015 | Hurd et al. | |

OTHER PUBLICATIONS

Author Unknown, "MIMO," Wikipedia.com, last modified Nov. 2, 2011, 5 pages, https://en.wikipedia.org/wiki/MIMO.

Author Unknown, "MIPI Alliance Application Note for Analog Control Interface—Envelope Tracking," ACI-ET, Version 1.0.0, Release 19, Oct. 4, 2012, 1 page.

Djoumessi, Erick Emmanuel, et al., "Electronically Tunable Diplexer for Frequency-Agile Transceiver Front-End," 2010 IEEE MTT-S International Microwave Symposium Digest (MTT), May 23-28, 2010, pp. 1472-1475.

Nguyen, Si, "Business Made Simple MIMO-OFDM in Long Term Evolution (LTE)," Nortel, Oct. 18, 2006, 12 pages.

Valkenburg, M.E., Van. "12.2 Pole Reciprocation." Analog Filter Design. New York: CBS College Publishing, 1982. pp. 327-333.

Wang, Zhao-Ming, et al., "The Design of a Symmetrical Diplexer Composed of Canonical Butterworth Two-Port Networks," 1988 IEEE International Symposium on Circuits and Systems, vol. 2, Jun. 7-9, 1988, pp. 1179-1182.

Williams, Arthur Bernard, et al., Electronic Filter Design Handbook, 3rd. ed. New York: McGraw-Hill, 1995. pp. 3.1-4.7 and 11.72-11.73.

Zverev, Anatol I., Handbook of Filter Synthesis, New York: John Wiley & Sons, 1967. pp. 192-193.

Notice of Allowance for U.S. Appl. No. 13/460,861, dated Jan. 30, 2014, 9 pages.

Notice of Allowance for U.S. Appl. No. 13/045,604, dated May 17, 2013, 11 pages.

Non-Final Office Action for U.S. Appl. No. 13/045,621, dated May 31, 2013, 13 pages.

Notice of Allowance for U.S. Appl. No. 13/045,621, dated Sep. 24, 2013, 10 pages.

Non-Final Office Action for U.S. Appl. No. 13/852,527, dated Sep. 30, 2014, 19 pages.

Final Office Action for U.S. Appl. No. 13/852,527, dated Jan. 12, 2015, 21 pages.

Non-Final Office Action for U.S. Appl. No. 13/852,527, dated Apr. 23, 2015, 23 pages.

Notice of Allowance for U.S. Appl. No. 13/852,527, dated Aug. 14, 2015, 8 pages.

Non-Final Office Action for U.S. Appl. No. 13/942,778, dated Jan. 22, 2015, 5 pages.

Notice of Allowance for U.S. Appl. No. 13/942,778, dated May 14, 2015, 10 pages.

(56) References Cited

OTHER PUBLICATIONS

Non-Final Office Action for U.S. Appl. No. 13/852,309, dated Oct. 14, 2014, 10 pages.
Final Office Action for U.S. Appl. No. 13/852,309, dated Feb. 18, 2015, 12 pages.
Advisory Action for U.S. Appl. No. 13/852,309, dated Apr. 29, 2015, 4 pages.
Advisory Action for U.S. Appl. No. 13/852,309, dated May 27, 2015, 4 pages.
Notice of Allowance for U.S. Appl. No. 13/852,309, dated Jul. 23, 2015, 7 pages.
Corrected Notice of Allowability for U.S. Appl. No. 13/852,309, dated Oct. 9, 2015, 5 pages.
Non-Final Office Action for U.S. Appl. No. 13/944,972, dated Nov. 13, 2014, 10 pages.
Notice of Allowance for U.S. Appl. No. 13/944,972, dated Apr. 13, 2015, 7 pages.
Non-Final Office Action for U.S. Appl. No. 14/051,601, dated May 5, 2015, 6 pages.
Notice of Allowance for U.S. Appl. No. 14/051,601, dated Aug. 14, 2015, 8 pages.
Corrected Notice of Allowance for U.S. Appl. No. 14/051,601, dated Sep. 16, 2015, 5 pages.
Notice of Allowance and Examiner-Initiated Interview Summary for U.S. Appl. No. 14/052,221, dated Feb. 26, 2015, 9 pages.
Non-Final Office Action for U.S. Appl. No. 13/929,987, dated Jan. 30, 2015, 11 pages.
Notice of Allowance for U.S. Appl. No. 13/929,987, dated Jun. 23, 2015, 8 pages.
Corrected Notice of Allowance for U.S. Appl. No. 13/929,987, dated Jul. 21, 2015, 5 pages.
Non-Final Office Action for U.S. Appl. No. 13/950,432, dated Jul. 28, 2015, 14 pages.
Final Office Action for U.S. Appl. No. 13/950,432, dated Jan. 14, 2016, 16 pages.
Advisory Action for U.S. Appl. No. 13/950,432, dated Apr. 28, 2016, 3 pages.
Final Office Action for U.S. Appl. No. 13/950,432, dated Jul. 21, 2016, 19 pages.
Advisory Action for U.S. Appl. No. 13/950,432, dated Oct. 6, 2016, 3 pages.
Non-Final Office Action for U.S. Appl. No. 13/952,880, dated Jul. 29, 2015, 17 pages.
Final Office Action for U.S. Appl. No. 13/952,880, dated Jan. 14, 2016, 20 pages.
Advisory Action for U.S. Appl. No. 13/952,880, dated Apr. 28, 2016, 3 pages.
Final Office Action for U.S. Appl. No. 13/952,880, dated Jul. 21, 2016, 23 pages.
Advisory Action for U.S. Appl. No. 13/952,880, dated Oct. 6, 2016, 3 pages.
Corrected Notice of Allowability for U.S. Appl. No. 13/852,309, dated Nov. 3, 2015, 5 pages.
Non-Final Office Action for U.S. Appl. No. 14/133,024, dated Sep. 15, 2015, 28 pages.
Final Office Action for U.S. Appl. No. 14/133,024, dated Apr. 8, 2016, 20 pages.
Advisory Action for U.S. Appl. No. 14/133,024, dated Jul. 8, 2016, 5 pages.
Non-Final Office Action for U.S. Appl. No. 14/011,802, dated Sep. 30, 2015, 65 pages.
Final Office Action for U.S. Appl. No. 14/011,802, dated Mar. 29, 2016, 69 pages.
Advisory Action for U.S. Appl. No. 13/950,432, dated Feb. 16, 2017, 3 pages.
Advisory Action for U.S. Appl. No. 13/952,880, dated Feb. 16, 2017, 3 pages.
Final Office Action for U.S. Appl. No. 13/952,880, dated Mar. 7, 2017, 26 pages.
Final Office Action for U.S. Appl. No. 14/011,802, dated Mar. 3, 2017, 67 pages.
Advisory Action for U.S. Appl. No. 13/943,969, dated Feb. 16, 2017, 3 pages.
Advisory Action for U.S. Appl. No. 13/953,808, dated Jan. 20, 2017, 3 pages.
Final Office Action for U.S. Appl. No. 13/953,808, dated Mar. 3, 2017, 23 pages.
Final Office Action for U.S. Appl. No. 13/950,432, dated Mar. 20, 2017, 25 pages.
Advisory Action for U.S. Appl. No. 13/950,432, dated May 26, 2017, 3 pages.
Advisory Action for U.S. Appl. No. 13/952,880, dated May 19, 2017, 3 pages.
Non-Final Office Action for U.S. Appl. No. 14/133,024, dated Apr. 10, 2017, 32 pages.
Advisory Action for U.S. Appl. No. 14/011,802, dated May 12, 2017, 3 pages.
Non-Final Office Action for U.S. Appl. No. 13/943,969, dated Mar. 30, 2017, 22 pages.
Advisory Action for U.S. Appl. No. 13/953,808, dated May 19, 2017, 3 pages.
Non-Final Office Action for U.S. Appl. No. 13/950,432, dated Jun. 28, 2017, 16 pages.
Non-Final Office Action for U.S. Appl. No. 13/952,880, dated Jun. 30, 2017, 19 pages.
Notice of Allowance for U.S. Appl. No. 14/011,802, dated Jul. 18, 2017, 10 pages.
Non-Final Office Action for U.S. Appl. No. 13/953,808, dated Jun. 29, 2017, 21 pages.
Advisory Action for U.S. Appl. No. 14/011,802, dated Jul. 13, 2016, 3 pages.
Non-Final Office Action for U.S. Appl. No. 14/011,802, dated Aug. 26, 2016, 67 pages.
Non-Final Office Action for U.S. Appl. No. 13/939,941, dated Jul. 1, 2016, 10 pages.
Non-Final Office Action for U.S. Appl. No. 13/943,969, dated Nov. 13, 2015, 15 pages.
Final Office Action for U.S. Appl. No. 13/943,969, dated Apr. 12, 2016, 18 pages.
Advisory Action for U.S. Appl. No. 13/943,969, dated Aug. 1, 2016, 3 pages.
Final Office Action for U.S. Appl. No. 13/943,969, dated Oct. 20, 2016, 20 pages.
Non-Final Office Action for U.S. Appl. No. 13/953,808, dated Nov. 13, 2015, 18 pages.
Final Office Action for U.S. Appl. No. 13/953,808, dated Apr. 13, 2016, 19 pages.
Advisory Action for U.S. Appl. No. 13/953,808, dated Aug. 1, 2016, 3 pages.
Final Office Action for U.S. Appl. No. 13/953,808, dated Oct. 26, 2016, 21 pages.
Non-Final Office Action for U.S. Appl. No. 14/444,128, dated Dec. 14, 2015, 8 pages.
Notice of Allowance for U.S. Appl. No. 14/444,128, dated Apr. 11, 2016, 9 pages.
Final Office Action for U.S. Appl. No. 13/950,432, dated Nov. 16, 2016, 23 pages.
Final Office Action for U.S. Appl. No. 13/952,880, dated Nov. 15, 2016, 25 pages.
Final Office Action for U.S. Appl. No. 14/133,024, dated Sep. 15, 2017, 35 pages.
Final Office Action for U.S. Appl. No. 13/943,969, dated Sep. 21, 2017, 16 pages.
Final Office Action for U.S. Appl. No. 13/950,432, dated Nov. 16, 2017, 8 pages.
Final Office Action for U.S. Appl. No. 13/952,880, dated Nov. 24, 2017, 8 pages.
Advisory Action for U.S. Appl. No. 14/133,024, dated Nov. 2, 2017, 7 pages.
Advisory Action for U.S. Appl. No. 13/943,969, dated Oct. 26, 2017, 3 pages.

(56) References Cited

OTHER PUBLICATIONS

Final Office Action for U.S. Appl. No. 13/953,808, dated Nov. 22, 2017, 22 pages.
Advisory Action for U.S. Appl. No. 13/950,432, dated Jan. 22, 2018, 3 pages.
Advisory Action for U.S. Appl. No. 13/952,880, dated Jan. 22, 2018, 3 pages.
Non-Final Office Action for U.S. Appl. No. 14/133,024, dated Feb. 9, 2018, 38 pages.
Non-Final Office Action for U.S. Appl. No. 13/953,808, dated Apr. 11, 2018, 21 pages.

* cited by examiner

PAIRS ARE SEPARATED

PAIRS ARE SEPARATED

M1 IS ON SP2T IS UP

M3 IS ON
M7 IS ON
SP2T IS UP

M3 IS ON
M7 IS ON
SP2T IS DOWN

M3 IS ON
M7 IS OPENING
SP2T IS UP

M3 IS OPENING
M7 IS ON
SP2T IS DOWN

M1 IS CLOSING
SP2T IS DOWN

CONTACT MEMS ARCHITECTURE FOR IMPROVED CYCLE COUNT AND HOT-SWITCHING AND ESD

RELATED APPLICATIONS

This application is a divisional of U.S. patent application Ser. No. 13/939,941, filed Jul. 11, 2013, which claims priority to U.S. provisional patent application No. 61/670,299, filed Jul. 11, 2012.

All of the applications listed above are hereby incorporated herein by reference in their entireties.

FIELD OF THE DISCLOSURE

The field of the disclosure is optimized switching circuitry utilizing MEMS (Microelectromechanical Systems) switches in series with solid state switches, or in parallel with solid state switches. Specifically, a MEMS switch is located in series with an SOI (Silicon-On-Insulator) switch.

BACKGROUND

Contact MEMS switches offer very low insertion loss, especially when building switch matrices with high throw counts (e.g. SP6T up to SP13T) and when operating at high frequencies (e.g. 2300 to 2700 MHz).

However, contact MEMS switches suffer from problems that affect their performance. For example, the following design constraints are difficult to achieve with MEMS switches: a maximum number of switching cycles over the lifetime of operation of at least 1e10 to 3e10 cycles; a fast switching time of less than 10 µs (this constraint requires very good anti-rebound control in MEMS); hot-switching capability (MEMS generally requires that the RF power is less than +0 dBm in order to avoid sparking and local heating that could degrade reliability); and tolerance for ESD (electrostatic discharge) events such as antenna discharge.

Thus, it is difficult to meet many design constraints using only MEMS switches.

SUMMARY

Conventionally, switches in a circuit (such as an RF Front End circuit in a mobile communication device) are either all MEMS switches, or all solid state switches. Solid state includes SOI (Silicon-On-Insulator), III-IV semiconductors such as GaAs, and other devices built from solid materials in which the electrons or other charge carriers are confined within the solid material. Solid state excludes vacuum and gas-discharge tubes, and excludes electro-mechanical devices such as relays and switches with moving parts. MEMS switches and solid state switches have relative advantages, and relative disadvantages in comparison to each other. For example, MEMS switches have the following disadvantages relative to solid state switches: low cycle lifetimes; slow switching times (e.g. 40 µs); poor hot switching; and poor resistance to ESD events. However, MEMS switches have the following advantages relative to solid state switches: low insertion loss, high linearity, and high power stand-off capability.

In one embodiment, a MEMS switch is placed in series with an SOI switch. The MEMS switch switches when changing frequency bands, while the SOI switch switches when changing between transmitting and receiving in a single band.

In another embodiment, a MEMS switch is placed in parallel with an SOI switch. Signals requiring fast switching (e.g. substantially less than 40 µs) or frequent switching are routed to the SOI switch, and signals that do not require fast or frequent switching are routed to the MEMS switch. For example, TDD (Time Division Duplexing) signals are routed to the SOI switch, and FDD (Frequency Division Duplexing) signals are routed to the MEMS switch.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
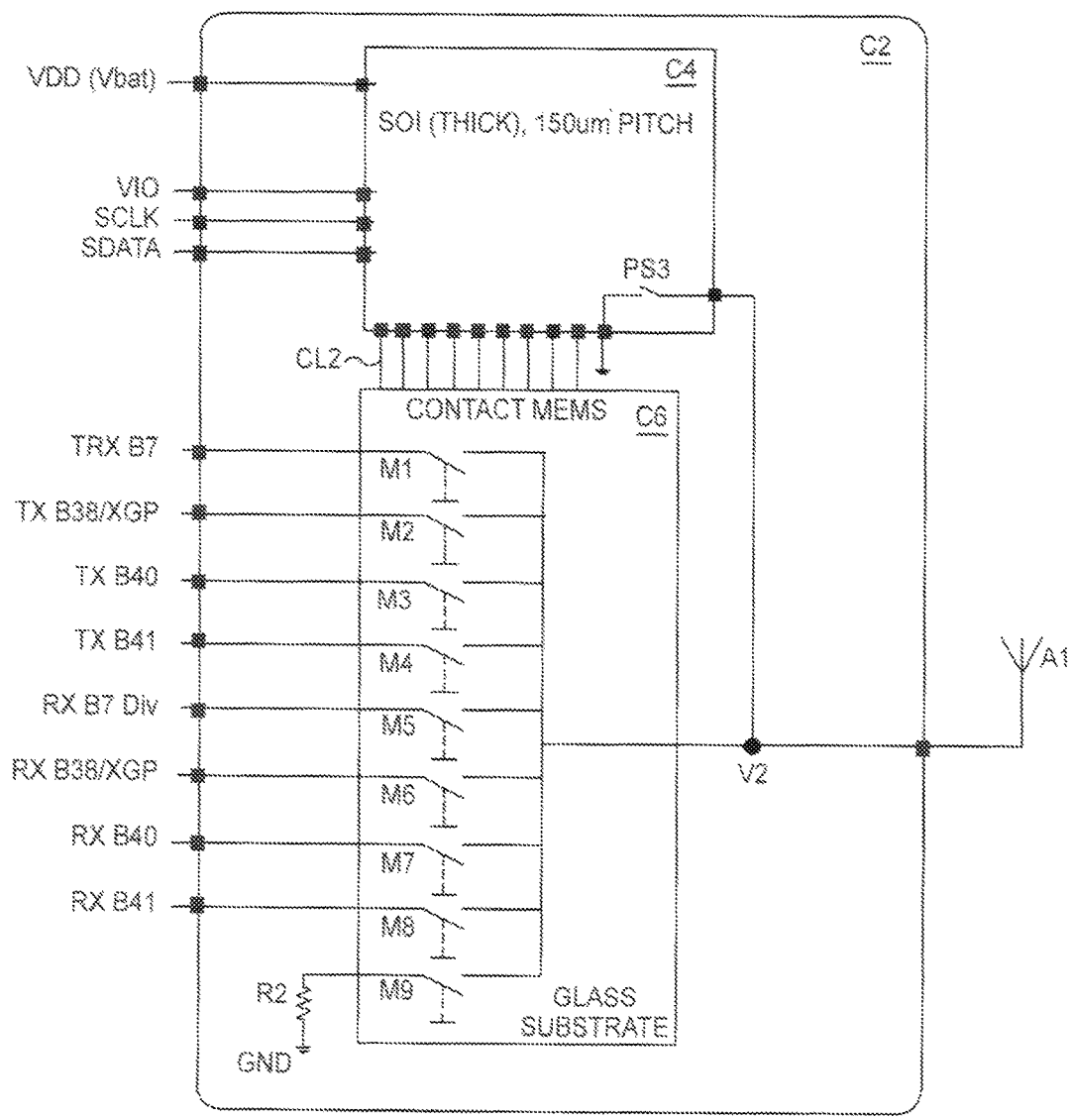
FIG. 1 illustrates conventional SP9T MEMS switch circuitry.

FIG. 1 is conventional SP9T MEMS switch circuitry C2 including an SP9T (single pole, nine throw) MEMS switch C6 and a control circuit C4.

Conventional contact MEMS switches offer very low insertion loss, especially when building switches matrix with high throw counts (SP6T up to SP13T) and when operating at high frequencies like 2300 to 2700 MHz.

In FIG. 1, an SP9T contact MEMS switch C6 operates from 2300-2700 MHz for B7 FDD (Band 7 Frequency Division Duplex) and LTE TDD (Long Term Evolution Time-Division Duplex) bands B38/40/41/41XGP. Contact MEMS switches configured as in FIG. 1 suffer from constraints which affect their reliability. These constraints are discussed above in the Background section.

The nine throws of SP9T contact MEMS switch C6 include nine individual MEMS switches labeled M1 through M9. These nine individual switches are associated with the following ports or signals: TRX B7 (transmit and receiver in Band 7 Frequency Division Duplex); TX B38/XGP (transmit in Band 38); TX B40 (transmit in Band 40); TX B41 (transmit in Band 41); RX B7 Div (receive in Band 7 through a diversity antenna); RX B38/XGP (Receiver in Band 38); RX B40 (receive in Band 40); RX B41 (receive in Band 41); and Ground.

Switch C6 connects the selected signal to node V2, and V2 is connected to antenna A1 and to pilot switch PS3.

Control circuit C4 is a thick film SOI that receives battery voltage VDD, an interface voltage VIO, a clock signal SCLK, and serial data SDATA. Control circuit C4 includes the pilot switch PS3 that may ground node V2 to reduce power across the contacts of the MEMS switches and thereby prolong their useful life. Control circuit C4 controls the MEMS switch C6 through control lines CL2.

In FIG. 1, all of the MEMS circuitry C6 may be located on a single glass substrate, and control circuit C4 may be located on a separate substrate.

Figure 2:
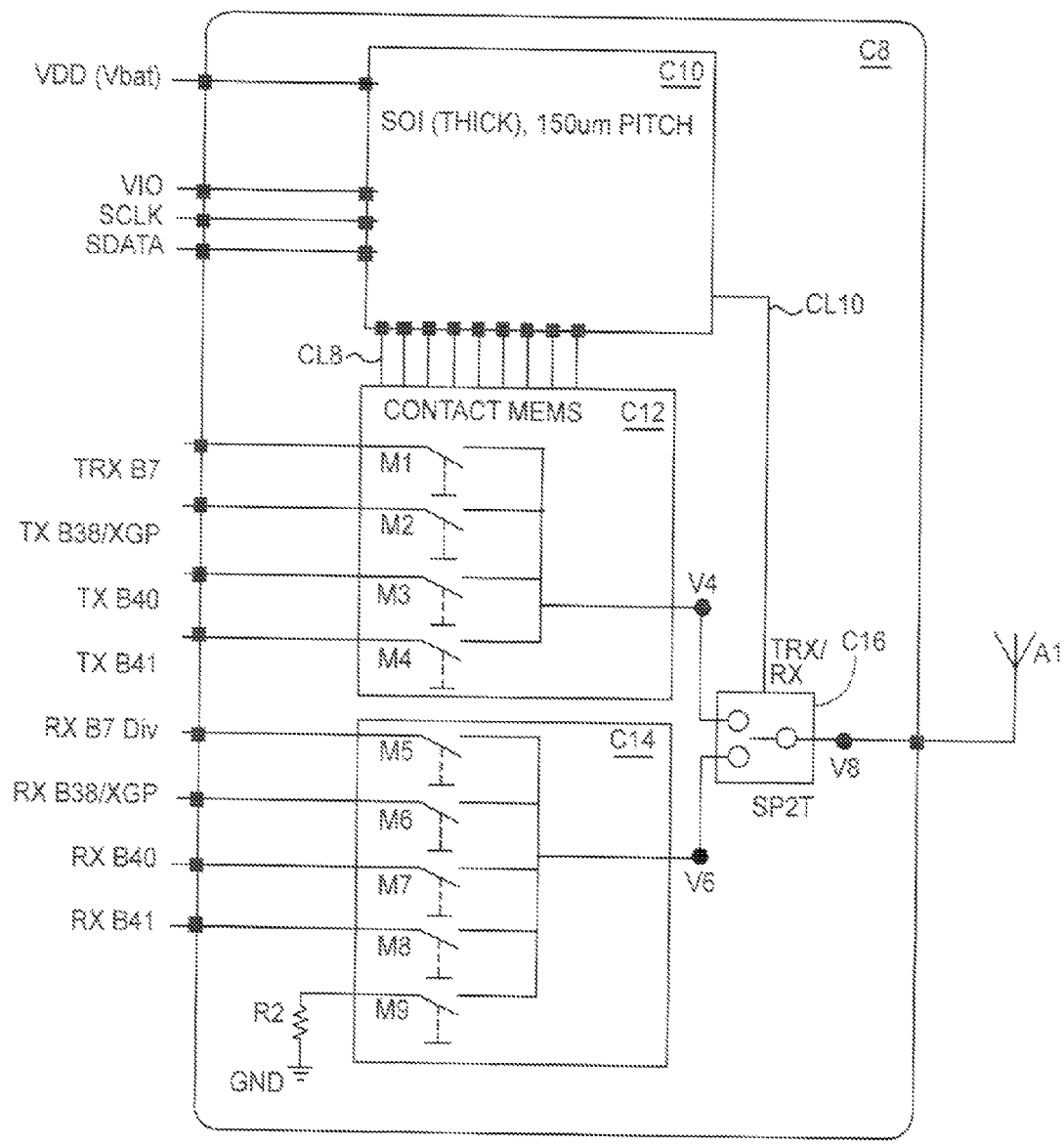
FIG. 2 illustrates series circuitry including MEMS circuitry in series with an SOI switch.

FIG. 2 illustrates series circuitry C8 including MEMS circuits C12 and C14 in series with an SOI circuit C16.

In FIG. 2, individual MEMS switches labeled M1 through M9 are each associated with the same ports or signals as described in FIG. 1. However, MEMS circuit C12 is a SP4T (single pole, four throw) switch connecting MEMS switches M1-M4 to node V4. MEMS circuit C14 is a SP5T (single pole five throw) switch connecting switches M5-M9 to node V6. MEMS circuit C12 is isolated from MEMS Circuit C14 (outputs V4 and V6 are isolated from each other).

Control circuit C10 is similar to control circuit C4 of FIG. 1, but controls both MEMS circuit C12 and MEMS circuit C14. It also no longer contains a pilot switch.

SOI SP2T (single pole, two throw) switch circuit C16 is controlled by control line CL10, selects either V4 or V6, and connects the selected node to node V8 and to antenna A1. In this illustrative example, SOI SP2T switch circuit C16 is made by an SOI silicon process. Other semiconductor devices such as SOS (Silicon-On-Sapphire) or PHEMT (Pseudomorphic High Electron Mobility Transistor) may be substituted for SOI C16. Additionally, an advanced or "special" MEMS may be substituted for SOI C16. This advanced or "special" MEMS is a very high quality MEMS that reduces at least one of the disadvantages of conventional MEMS, and that is of higher quality than the MEMS in circuits C12 and C14.

In combination, MEMS circuits C12 and C14 may be described as a "restricted" DP9T switch, in which the first pole (V4) is restricted to being connected only the signals associated with switches M1-M4, and in which the second pole (V6) is restricted to being connected only with the signals associated with switches M5-M9). Of course, the first pole and the second pole are isolated from each other. This "restricted" terminology is not commonly used, but does indicate that MEMS circuits C12 and C14 are closely associated with each other, may be located on a single glass substrate or die (not shown), and may be controlled with one set of control lines.

Some of the signals are hereby defined as "opposites" or as "pairs." Specifically, a paired signal is defined as a transmit signal and a receive signal (in a single band) that is transmitted or received on separate paths or nodes (not duplexed).

For example, band B38/XGP is split into paired signals or nodes TX B38/XGP and RX B38/XGP. Other paired signals include: TX B40 and RX B40; and TX B41 and RX B41. Thus, FIG. 2 includes three pairs of signals (six signals) as discussed above, plus three unpaired signals (TRX B7, RX B7 Div, and GND).

It is important that the paired signals are routed such that the paired signals are not associated with a single MEMS circuit. In other words, the first signal of a paired signal is associated with a first MEMS circuit (e.g., TX B40 is associated with MEMS circuit C12), and the second signal of the paired signal is associated with a second MEMS circuit (RX B40 is associated with MEMS circuit C14).

Splitting a single paired signal into two distinct MEMS circuits enables the efficient series processing of the split paired signal, as discussed in detail in later figures. In FIG. 2, all three paired signals (TX B38/XGP and RX B38/XGP; TX B40 and RX B40; and TX B41 and RX B41) are split, so that all of these split pairs may be processed efficiently.

The allocation or routing of unpaired signals (TRX B7, RX B7 Div, and GND) is less critical. In FIG. 2, duplexed signal TRX B7 is associated with MEMS circuit C12 (along with all of the transmit signals of the split pairs: TX B38/XGP; TX B40; and TX B41).

In FIG. 2, unpaired receive signal RX B7 Div and unpaired Ground are associated with MEMS circuit C14.

To summarize, MEMS circuit C12 includes the TRX port for an FDD band (TRX stands for TX and RX, e.g. band 7) and includes the TX ports of TDD bands (e.g. LTE TDD band 38/40/41). MEMS circuit C14 includes all the RX ports for TDD (e.g. LTE TDD band 38/40/41) and also the RX ports for diversity/RX MIMO.

The first group of switches (e.g. SP4T MEMS circuit C12) and the second group of switches (e.g. SP5T MEMS circuit C14) are connected to an SOI SP2T switch circuit C16.

Thus, SOI circuit C16 can switch very quickly (a characteristic of semiconductor devices) back and forth between transmit node B40 (though MEMS circuit C12) and receive node RX B40 (through MEMS circuit 14) while operating in Band 40, and without switching any individual MEMS switch.

In this illustrative example, SOI SP2T switch circuit C16 is made by an SOI silicon process as shown in FIG. 2. Other semiconductor devices such as SOS (Silicon-On-Sapphire) or PHMET (Pseudomorphic High Electron Mobility Transistor) may substitute for SOI C16. Additionally, an advanced or "special" MEMS may be substituted for SOI C16. This advanced or "special" MEMS is a very high quality MEMS that reduces at least one of the disadvantages of conventional MEMS.

In FIG. 2, the number of cycles of switching for the MEMS is significantly reduced because the SP2T SOI circuit C16 will be performing most of the switching (between V4 for TX/TRX and V6 RX in TDD mode)

Thus, the MEMS switches in MEMS circuits C12 and C14 do not switch while a single band operates (transmits; receives; or transitions between transmitting and receiving), and generally only switch when the band of operation changes.

Additionally, SOI circuit C16 provides hot-switching protection to the MEMS switches when they are opened or closed, and also providing ESD (Electro Static Discharge) protection. As used here, 'hot-switching protection' refers to the reduction of power incident on a given MEMS switch during the making or breaking of contact. Further, the SOI circuit C16 may provide fast switching (less than 5 µs) and the MEMS switches may provide relatively slow switching (20-40 µs).

Figure 3:
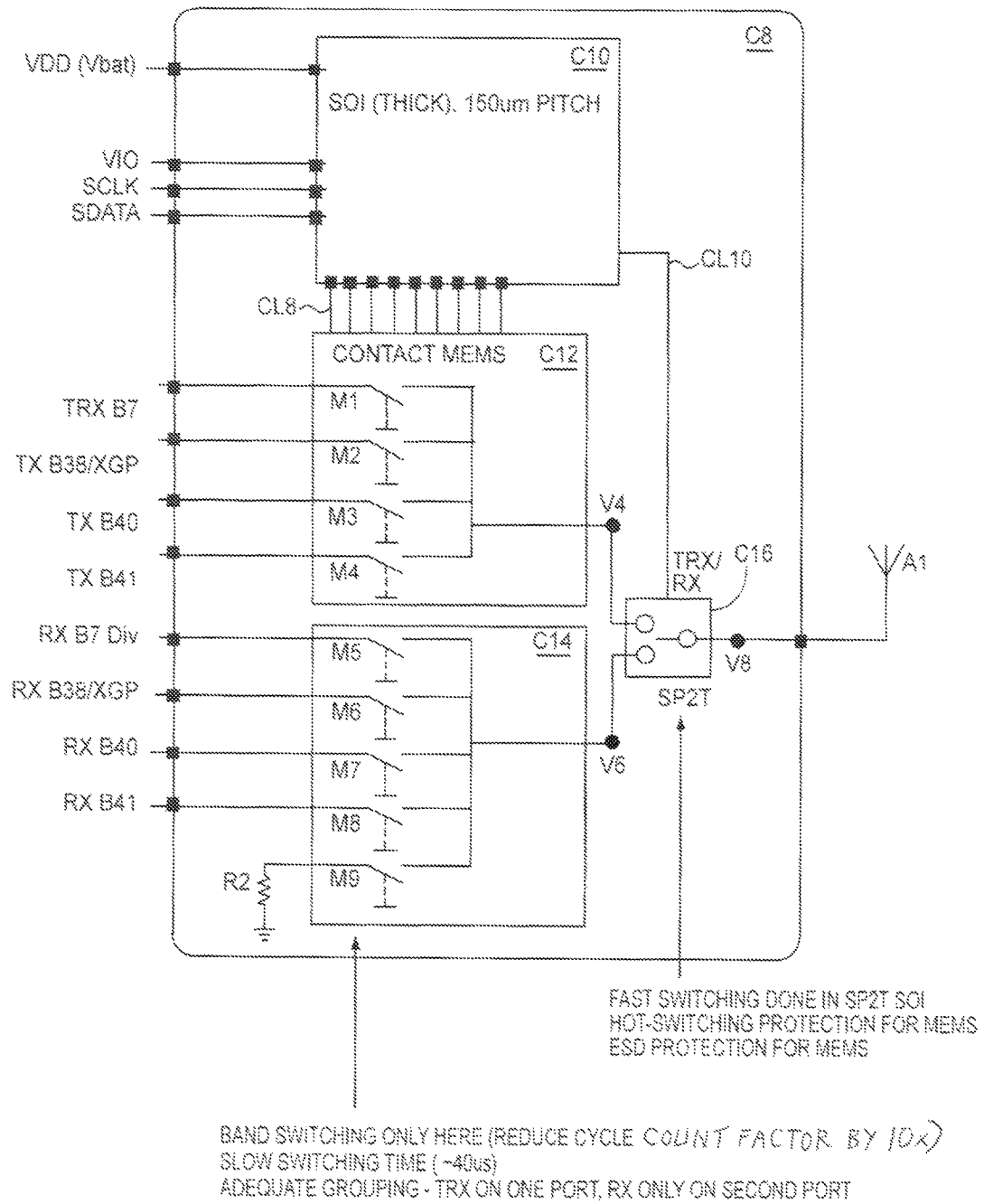
FIG. 3 illustrates summary information regarding FIG. 2.

FIG. 3 illustrates summary information regarding FIG. 2. Specifically, FIG. 3 emphasizes that SOI circuit C16 provides: relatively fast switching; hot-switching protection for MEMS circuits C12 and C14; and ESD protection for MEMS circuits C12 and C14.

MEMS circuits C12 and C14 provide band switching only; have relatively slow switching times; and are grouped such that pairs are split (e.g. TX B40 in MEMS circuit C12, and RX B40 in MEMS circuit C14). In this embodiment, TRX B7 is grouped with the transmit signals or nodes.

Figure 4:
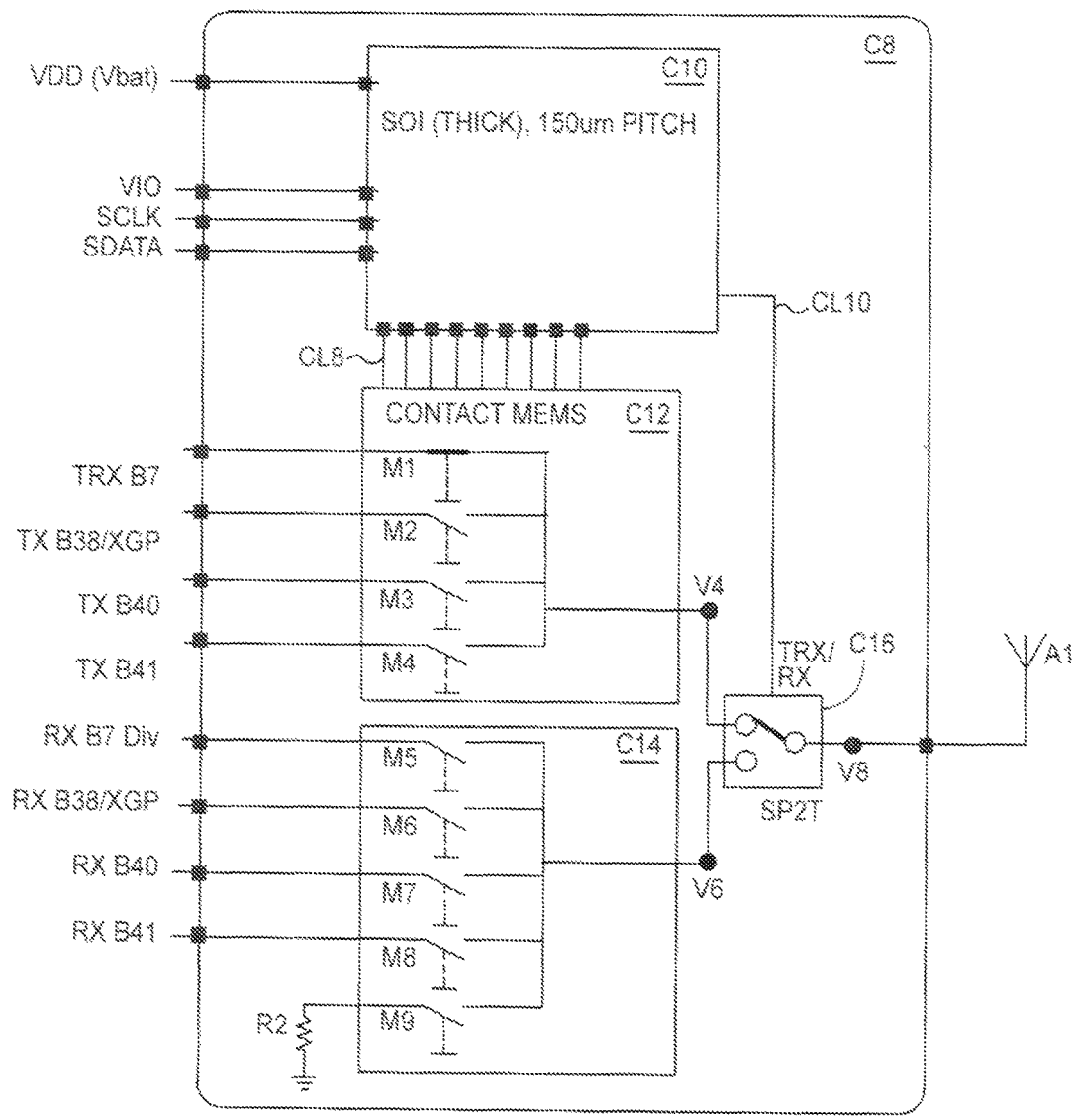
FIG. 4 illustrates a first state of FIG. 2, wherein a TRX B7 node (transmit and receive duplex TRX B7) or signal is selected.

FIG. 4 illustrates a first state of FIG. 2, wherein a TRX node (transmit and receive duplex TRX B7) or signal is selected.

Specifically, FIG. 4 illustrates that the FDD TRX B7 port is connected to the antenna A1 through switch M1 in MEMS circuit C12 and through SOI SP2T circuit C16. Switch M1 is ON (or CLOSED), and circuit C16 is UP.

FIG. 4, the state of MEMS circuit C14 is not critical, because C14 is isolated by C16, and because TRX B7 is a frequency duplexed signal that does not require switching among different nodes in order to change from receiving to transmitting (or vice versa). However, in this first state it is good practice to turn OFF (or OPEN) switches M5-M9 in order to further isolate the associated nodes or ground.

Figure 5:
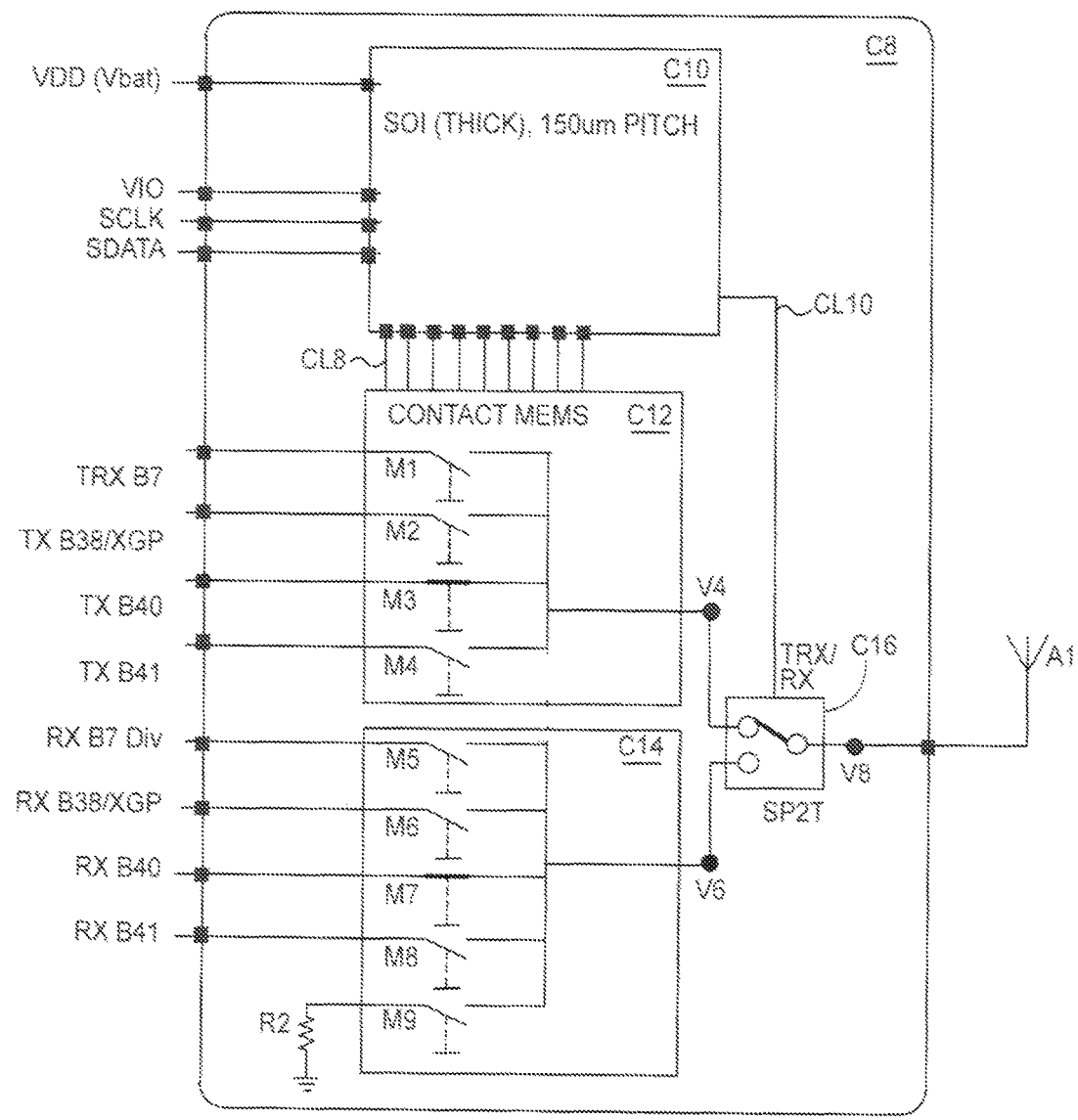
FIG. 5 illustrates a second state of FIG. 3, wherein a transmit/receive pair of a first band is selected by the MEMS switch, and wherein the transmit path of the first band is selected by the SOI switch.

FIG. 5 illustrates a second state of FIG. 2, wherein a transmit/receive pair of a first band is selected by the MEMS circuits C12 and C14, and wherein the transmit path of the first band is selected by the SOI circuit C16. M3 is ON, M7 is ON, and SP2T is UP.

Specifically, FIG. 5 illustrates an example of the operation of LTE TDD B40 (Band 40) where both TX B40 and RX B40 MEMS contact switches (M3 and M7 respectively) are ON (or closed) simultaneously; such switching between TX and RX operation for Band 40 may be performed solely via the SP2T SOI circuit C16.

SOI circuit C16 is shown in the UP state. In this fashion, node TX B40 is connected sequentially to switch M3 (ON), to node V4, to SOI circuit C16, to node V8, and finally to antenna A1. In other words, series parallel circuit C8 is configured to transmit Band 40.

Figure 6:
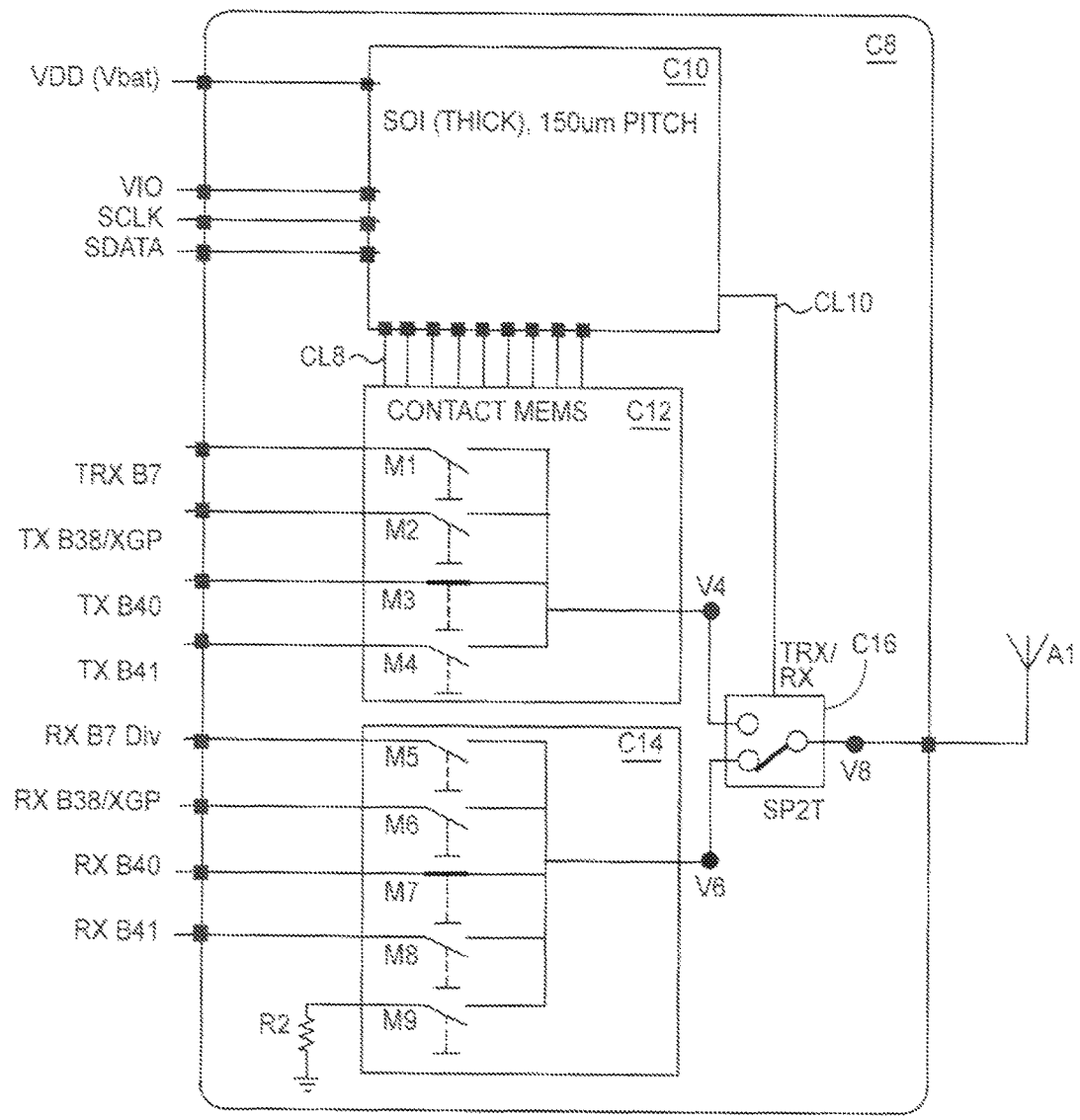
FIG. 6 illustrates a third state of FIG. 3, wherein a transmit/receive pair of a first band is selected by the MEMS switch, and wherein the receive path of the first band is selected by the SOI switch.

FIG. 6 illustrates a third state of FIG. 2, wherein a transmit/receive pair of a first band is selected by the MEMS circuits C12 and C14, and wherein the receive path of the first band is selected by the SOI circuit C16. M3 is ON, M7 is ON, and SP2T is DOWN.

FIG. 6 is the same as FIG. 5, except that SP2T in SOI circuit C16 is now in the DOWN state (instead of the UP state). Relative to FIG. 5, FIG. 6 is now configured to receive (instead of transmit) Band 40. This change (from transmitting in Band 40 to receiving in Band 40) is caused solely by switching SP2T in SOI circuit C16 from UP to DOWN.

In FIG. 6, antenna A1 is connected sequentially to: node V8; SOI circuit C16; node V6; switch M7; and node RX B40.

FIG. 5 may be returned to (from FIG. 6) by switching SP2T in SOI circuit C16 from DOWN to UP.

Thus, FIG. 5 and FIG. 6 illustrate that transitioning back and forth over time from transmitting to receiving in a single band (TDD or time division duplexing) may be accomplished solely by repeatedly switching SOI circuit C16 UP and DOWN.

The MEMS switches M1-M9 do not switch at all during operation from TX to RX and vice-versa (while in a single band). The switching between TX to RX can be done very quickly using SOI (e.g., on the order of 5 µs).

As an additional benefit, the number of cycles is significantly reduced for the MEMS switches (e.g., by a factor of 100×), because the MEMS switches only switch when a band is changed. Band changes typically occur about once per second (very infrequently). In contrast, transmit/receive changes (within a band) typically occurs about once every 10 ms (very frequently, or about 100 times more frequently than band changes).

Further, SOI circuit C16 provides an isolation of a TX (or TRX) signal to the RX port of at least 25 dB, thus reducing the level of any leakage TX power (to the RX port) to less than +0 dBm for a +24 dBm TX signal.

Additionally, as discussed below, certain switching logic avoids closing or opening a MEMS switch while there is some power present at one of its ports, also known as hot-switching. For example, undesired power may come from an ISM (Industrial, Scientific, and Medical) band blocker signal or from any external blocker signal (such as a TV station). Specifically, if SOI circuit C16 is switched into a position that provides isolation for the MEMS switch to be closed or opened (to be transitioned), then the leakage port is less than +0 dBm.

Figure 7:
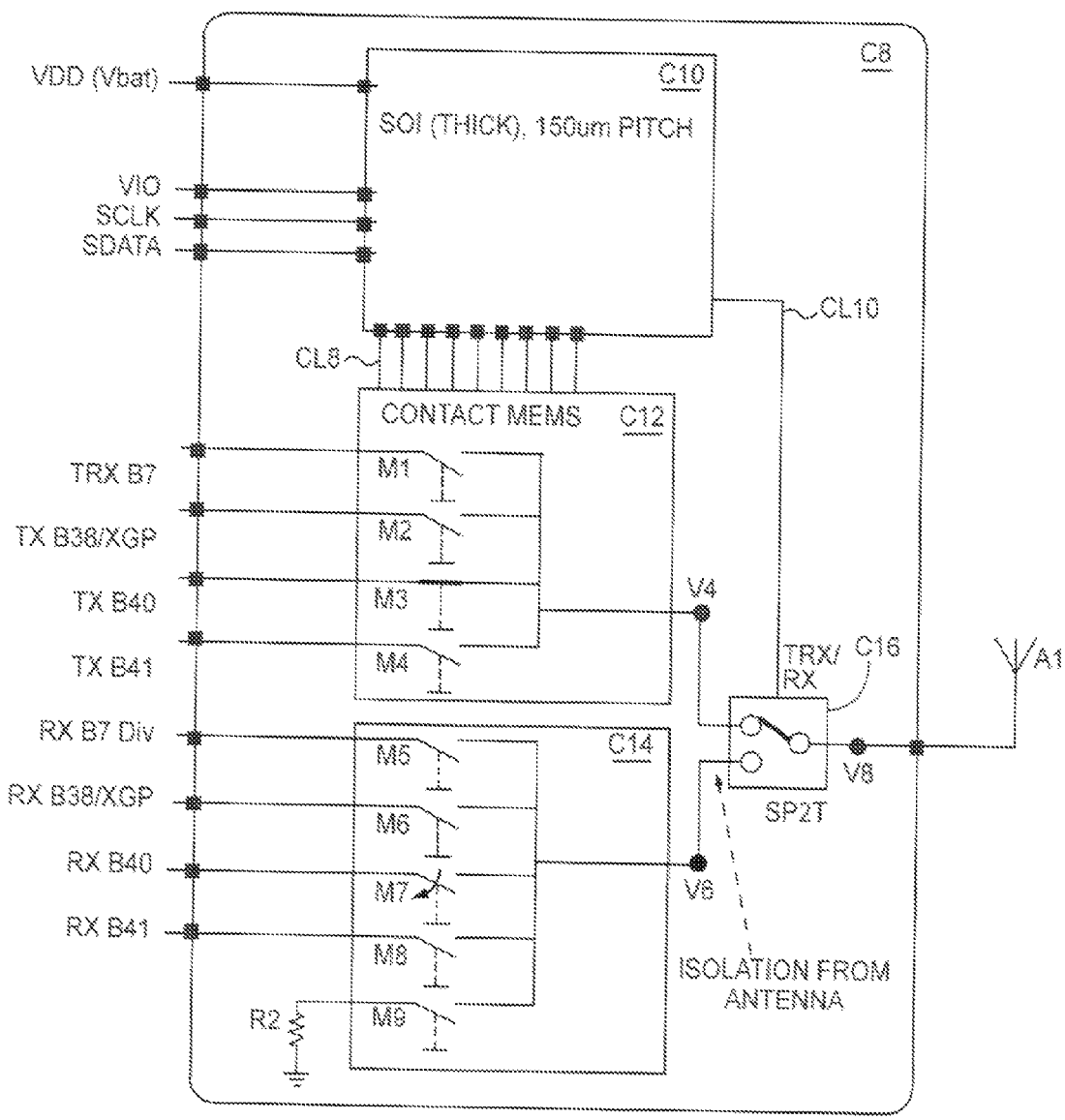
FIG. 7 illustrates a first transition of FIG. 3, wherein the receive path of the first band is turned OFF while isolated by the SOI switch.

FIG. 7 illustrates a first step in changing bands, wherein the receive path M7 of the first band is turned OFF while isolated by the SOI circuit C16.

Specifically, FIG. 7 illustrates the beginning of a transition from Band 40 to Band 41 that may occur immediately after transmitting in Band 40 (as shown in FIG. 5). The RX B40 node is further isolated by turning OFF (opening) M7 as a first step in changing from a first band to a second band. Starting with FIG. 5, SOI circuit C16 remains in the UP position (isolating MEMS circuit C14) while M7 is turned OFF (opened) as shown in FIG. 7.

The following set of steps (not shown) will complete the change in bands from Band 40 to Band 41: turn ON (close) M8; turn DOWN SOI circuit C16 (isolating MEMS circuit C12); turn OFF (open) M3; turn ON (close) M4. Now Band 41 is selected for receiving (through M8), and switching between receiving and transmitting is performed solely by transitioning SOI circuit C16.

The following alternative (slightly longer) set of steps also will complete the change in bands from Band 40 to Band 41 (starting with turning M7 OFF as shown in FIG. 7): turn DOWN SOI circuit C16 (isolating MEMS circuit C12); turn OFF (open) M3; turn ON M4; turn UP SOI circuit C16 (isolating MEMS circuit C14); turn ON (close) M8. Now Band 41 is selected for transmitting, and switching between transmitting and receiving is performed solely by transitioning SOI circuit C16.

Figure 13:
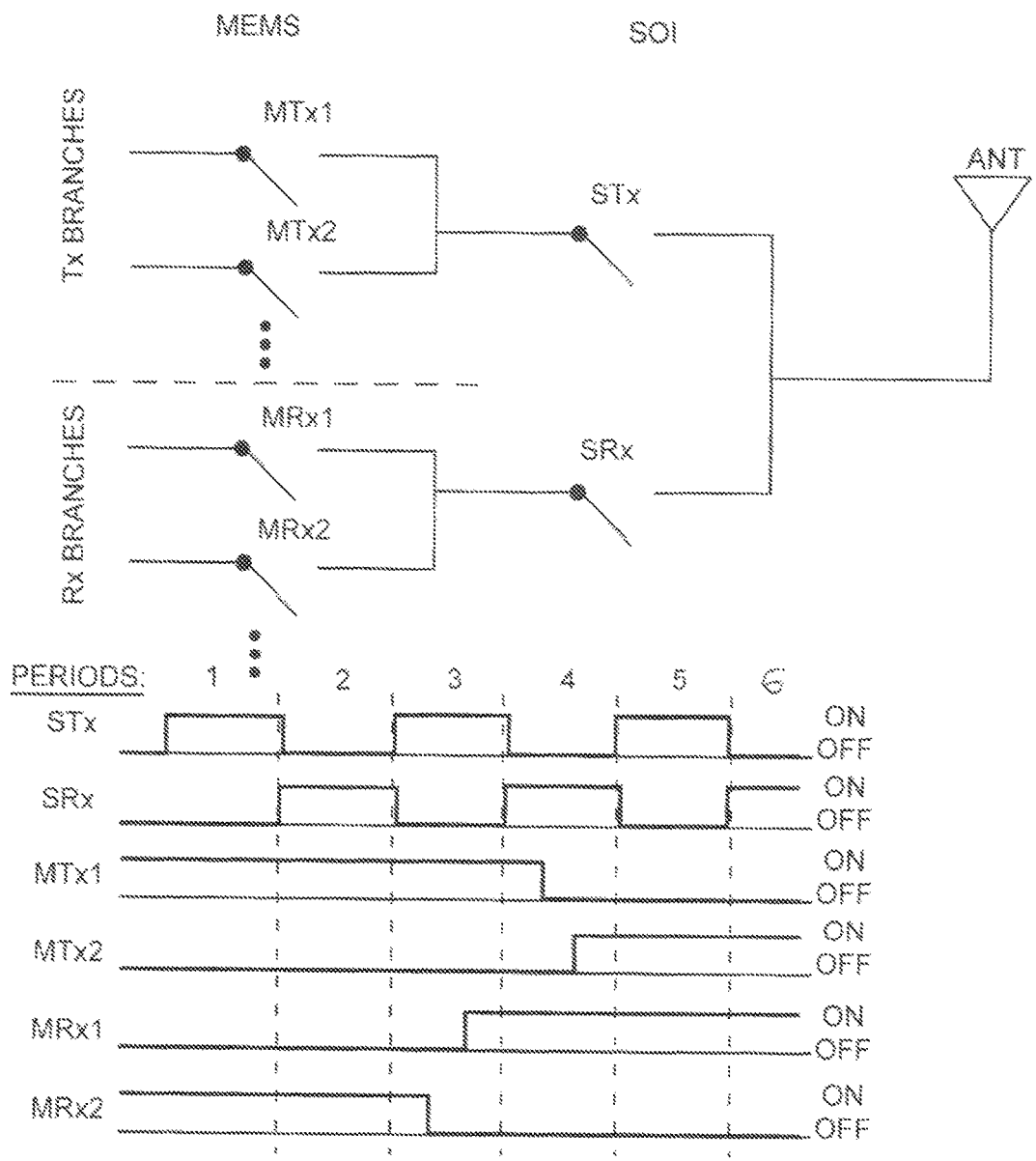
FIG. 13 illustrates a timing chart for a MEMS switch in series with an SOI switch. The FIG. 13 timing chart corresponds to the signal pairs of FIG. 2 (excluding TRX B7, RX B7 Div, and GND).

Other sets of steps may also switch from one band to another (see timing chart in FIG. 13).

Figure 8:
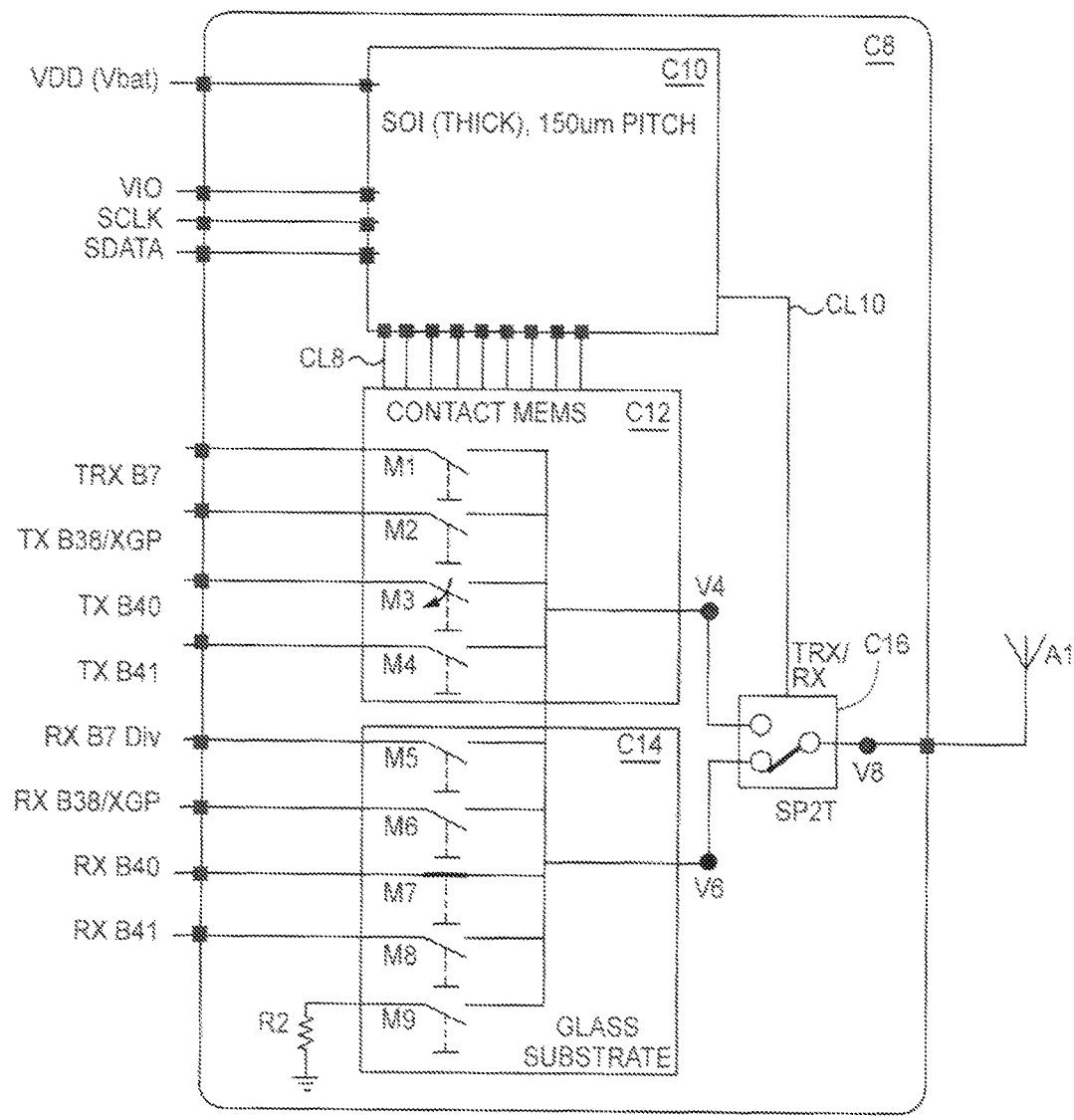
FIG. 8 illustrates a second transition of FIG. 3, wherein the transmit path of the first band is turned OFF while isolated by the SOI switch.

FIG. 8 illustrates an alternative first step in changing bands, wherein the transmit path M3 of the first band is turned OFF while isolated by the SOI circuit 16.

Specifically, FIG. 8 illustrates a first step that may occur immediately after receiving in Band 40 (as shown in FIG. 6); MEMS switch M3 is turned OFF (opened), isolating node TX B40.

The following set of steps (not shown) completes the change in bands from Band 40 to Band 41 (starting with turning M3 OFF as shown in FIG. 8): while SP2T of SOI circuit C16 remains in the DOWN position, turn ON (close) M4; turn UP SOI circuit C16; turn OFF (open) M7; turn ON (close) M8. Now the circuits are configured to transmit in Band 41.

The following alternative (slightly longer) set of steps (not shown) also completes the change in bands from Band 40 to Band 41: turn UP SOI circuit C16; turn OFF (open) M7; turn ON (close) M8; turn DOWN SOI circuit C16; turn ON (close) M4. Now the circuits are configured to receive in Band 41.

Other sets of steps may also switch from one band to another.

Figure 9:
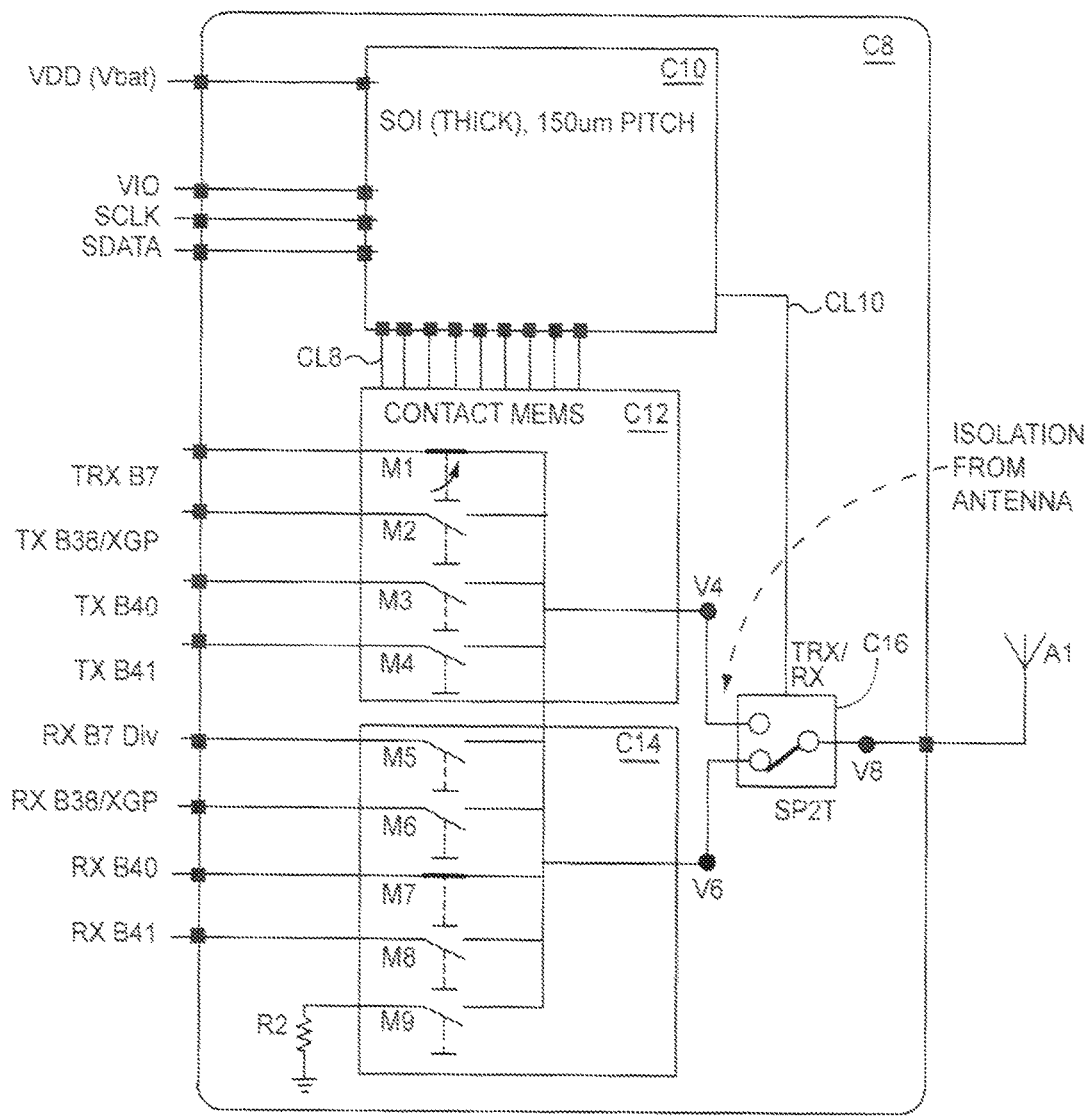
FIG. 9 illustrates a third transition of FIG. 2, wherein a TRX (transmit and receive duplex node) is turned ON while isolated by the SOI circuit.

FIG. 9 illustrates a third transition of FIG. 2, wherein a TRX (transmit and receive duplex node) is turned ON while isolated by the SOI circuit C16.

FIG. 9 illustrates turning ON (closing) MEMS switch M7 while the SOI circuit C16 is in a DOWN position to provide isolation and to avoid hot-switching of M7.

It is possible (and efficient) to sequence opening and closing of two switches in MEMS circuit C12 while the SOI circuit C16 is in a single position. For example, (not shown, starting with FIG. 6, with SOI circuit C16 in the DOWN position): M3 is turned OFF (opened); M1 is turned ON (closed); and SOI circuit C16 is turned UP (now the circuits are configured for TRX B7). This band transition from B40 to TRX B7 required a first MEMS transition, sequential second MEMS transition, and then an SOI transition. The total time for this band switch change (from Band 40 to TRX B7) is less than 80 μs.

Further, it is good practice (not shown) to finally turn OFF (open) M7, although transmitting or receiving by TRX B7 does not necessarily have to wait for this optional last step.

A slightly different set of steps transitions from Band 40 to TRX if the circuits begin as shown in FIG. 5 (with SOI circuit C16 in the UP position).

Figure 10:
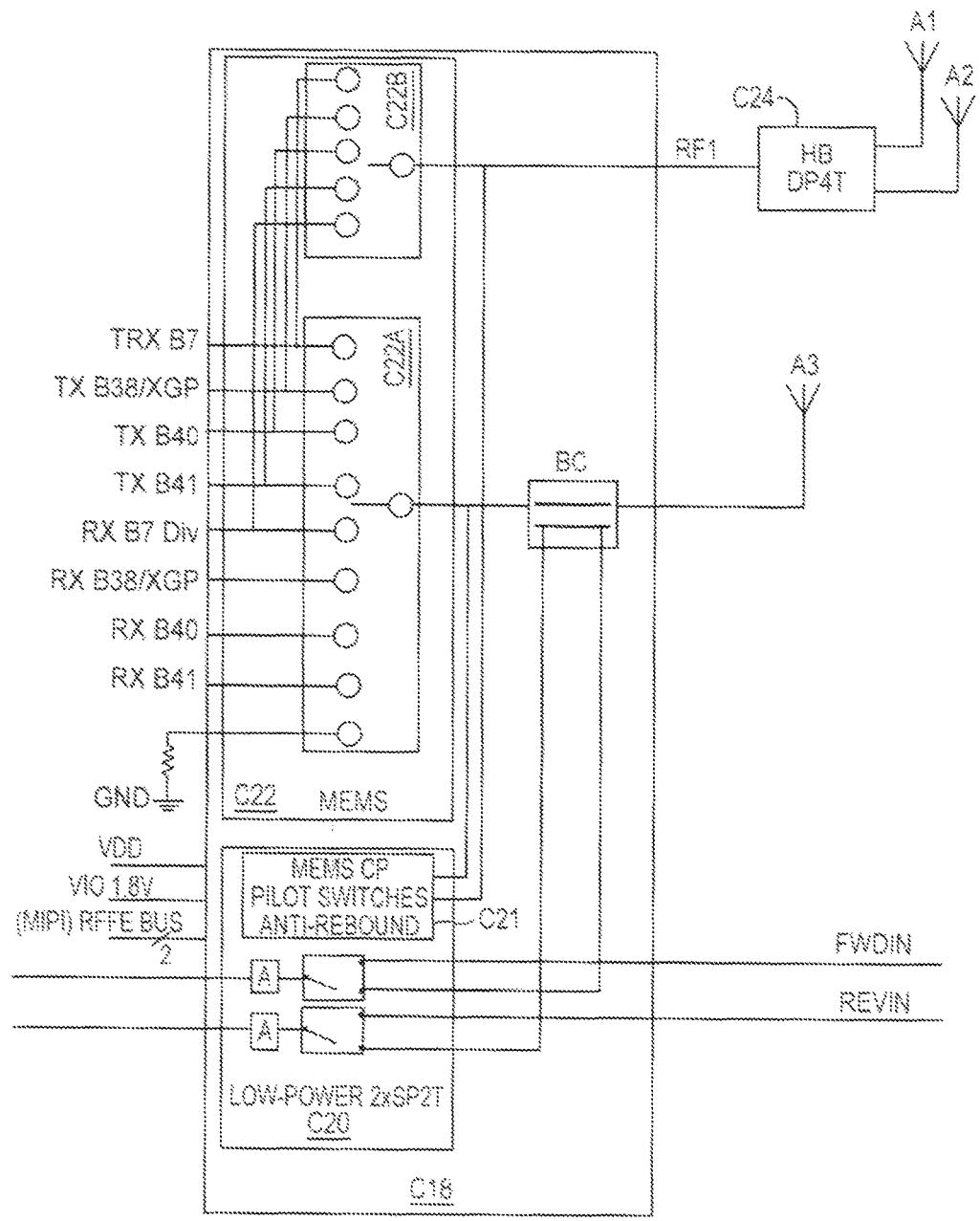
FIG. 10 illustrates a parallel circuit C18, including a MEMS circuit in parallel with an SOI circuit, including multiple antennas (A1, A2, and A3), and including a bidirectional coupler.

FIG. 10 illustrates a parallel circuit C18, including a MEMS circuit C22 in parallel with an SOI circuit C20, including multiple antennas (A1, A2, and A3), and including a bidirectional coupler (BC).

Specifically, FIG. 10 shows a series circuitry C26 (also referred to as optimized switching circuitry) of a portion of a radio front end (RFFE) using MEMS switches and covering 24 bands. Nodes or signals include: TRX B7; TX B38/XGP; TX B40; TX B41; RX B7 Div; RX B38/XGP; RX B40; RX B41; and Ground. A UHB MEMS switch C22A connects antenna A3 (or antennas A1/A2 via RF1 port) to one of the nodes listed above.

SOI circuit C20 includes two SP2T switches, and includes control circuitry C21 (such as charge pump, pilot switches, and anti-rebound circuitry).

Bidirectional coupler BC measures power going to or coming from antenna A3. The bidirectional coupler measurements transit through SOI SP2T in SOI C20.

MEMS circuit C22 includes: MEMS circuit C22A connecting the inputs to antenna A3, and MEMS circuit C22B connecting a subset of the inputs to one of antennas A1 and A3.

The series circuitry C26 may be modified using the concepts shown below in FIG. 11 (adding an SOI in series).

The SOI SP2T switches in SOI C20 may be controlled by control circuitry C21 located in the same SOI C20 die. This avoids duplicating the serial bus (MIPI RFFE BUS). An SP2T SOI switch insertion loss (IL) is around 0.3 dB.

If an SP9T were to be built in SOI, the IL at 2300-2700 MHz would be around 0.085 dB*7+0.3 dB=~0.9 dB w/o including packaging losses. (0.085 dB for additional throw relative to SOI SP2T). If an SP5T were to be built in MEMS, the IL at 2300-2700 MHz would be around 0.005*3+0.22 dB=0.235 dB without including packaging losses. (0.005 dB for additional throw relative to a MEMS SP2T).

If the SP2T SOI is added to the MEMS SP5T IL, we get 0.235 dB+0.3=0.535 dB, which is 0.4 dB lower than the SOI only solution. Thus, the configuration of FIG. 2 (MEMS in series with SOD provides a total insertion loss that is 0.4 dB lower than the SOI only solution. See discussion of FIG. 11 below.

The above figures may also be generalized such that the first MEMS switch and the second MEMS switch are associated with nodes that contain "opposite" or "paired" configurations, as discussed in FIG. 12 below.

Figure 11:
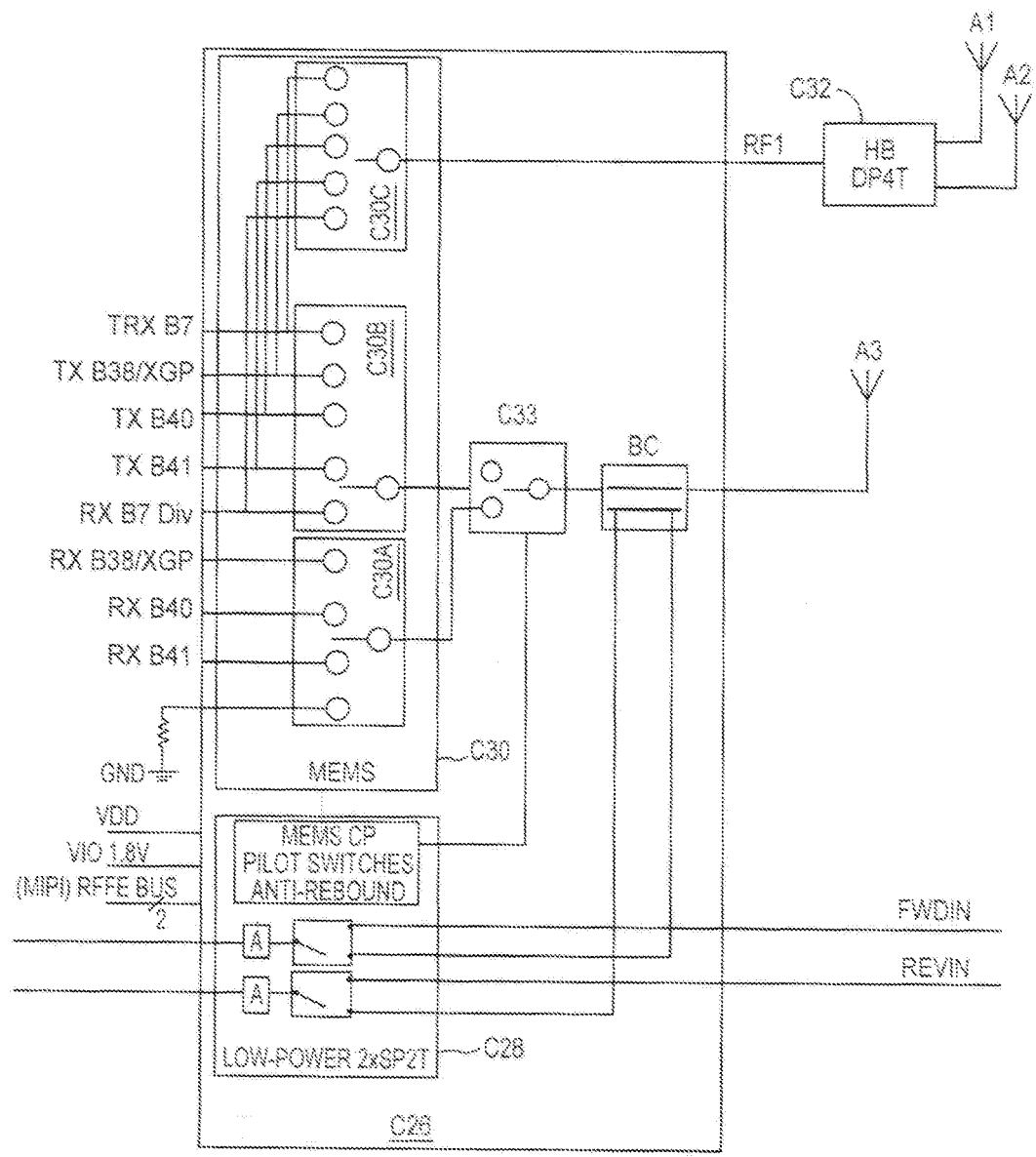
FIG. 11 illustrates a MEMS switch in series with a first SOI switch, and in parallel with a second SOI switch.

FIG. 11 illustrates a MEMS circuit 30 in series with a first SOI switch C33, and in parallel with a second SOI switch C28.

FIG. 11 is very similar to FIG. 10, except: MEMS circuit C22A (SP9T) in FIG. 10 becomes MEMS Circuits C30A (SP4T) and C30B (SP5T); and SOI circuit C33 is added in series with C30A and in series with C30B.

This configuration (MEMS circuits in series with SOI circuit) is as fast as an all SOI circuit in most circumstances (because most switching is from transmit to receive within a single band, and is handled solely by SOI circuit C33), and this configuration has about 0.4 dBG less insertion loss than an all SOI circuit (as discussed above). Thus, this configuration retains most of the high speed advantage of an all SOI circuit, and also avoids much of the insertion loss of an all SOI circuit.

Also, SOI circuit C32 receives signal RF1 from C30C, and outputs this signal to antenna A1 or to antenna A2.

Figure 12:
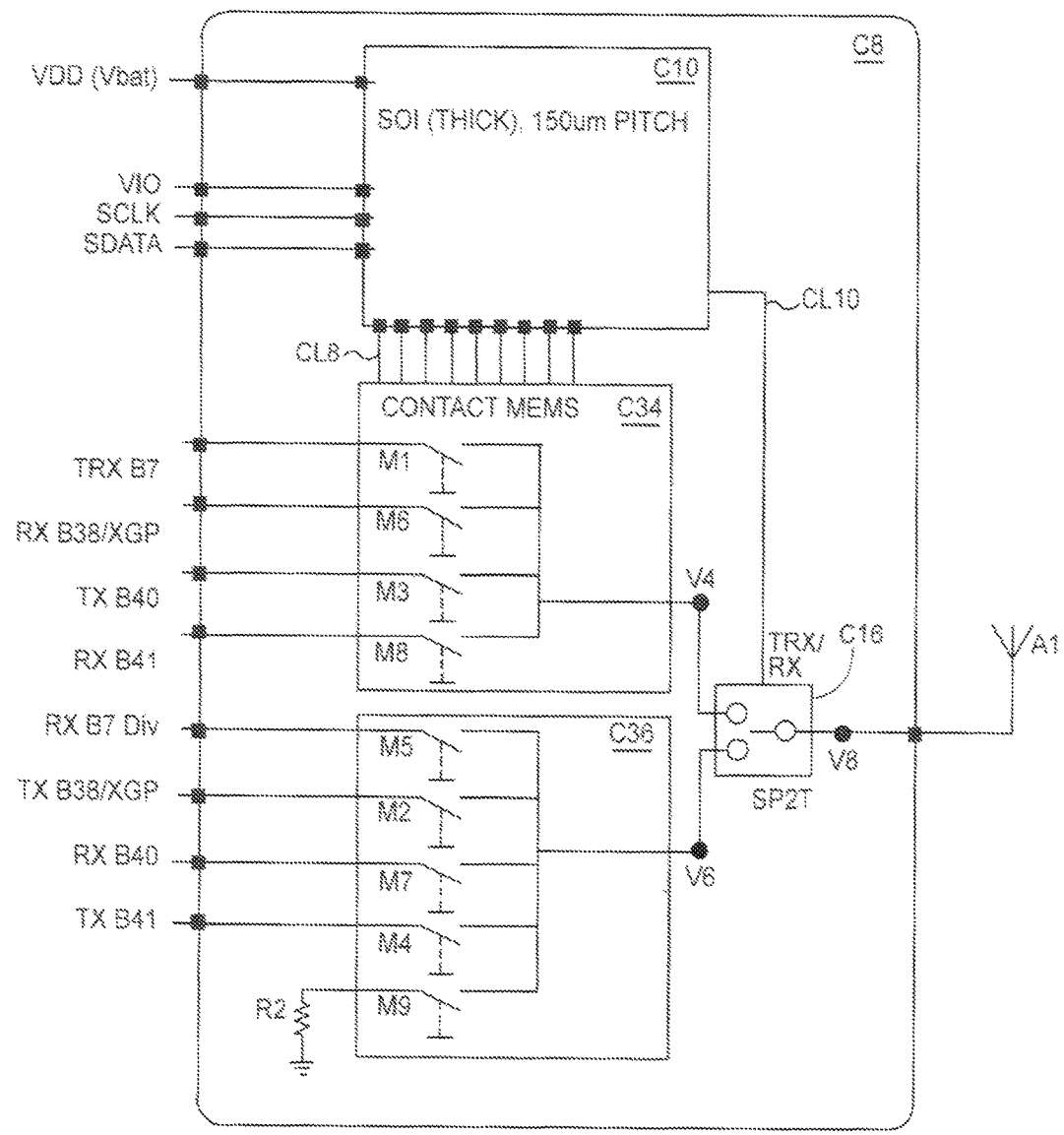
FIG. 12 illustrates a generalized structure very similar to FIG. 2, except that the dedicated transmitter nodes are not necessarily grouped together, and the dedicated receiver nodes are not necessarily grouped together.

FIG. 12 illustrates a generalized structure very similar to FIG. 2, except that the dedicated transmitter nodes (TX B38/XGP, TX B40, and TX B41) are not necessarily grouped together, and the corresponding (or paired or opposite) dedicated receiver nodes (RX B38/XGP, RX B40, and RX B41) are not necessarily grouped together.

In FIG. 12, each transmitter/receiver signal pair is separated such that a first member of the signal pair is routed through a MEMS circuit and a second member of the signal pair is routed through a different MEMS circuit. In this fashion, an SOI circuit may quickly switch from the first member of the signal pair to the second member of the signal pair without requiring any MEMS switch to be switched.

Specifically, a first signal pair comprises RX B38/XGP associated with MEMS circuit C34 and TX B38/XGP associated with MEMS circuit C36. A second signal pair comprises TX B40 associated with MEMS circuit C34 and RX B40 associated with MEMS circuit C36. A third signal pair comprises RX B41 associated with MEMS circuit C34 and TX.

In a general sense (not shown), there may be three MEMS circuits, each MEMS circuit connected to an SOI circuit (or other semiconductor circuit, or "special" MEMS circuit) having at least three throws (such as a SP3T SOI circuit). In this general case, a first signal pair may be distributed among the first and second MEMS circuits, a second signal pair may be distributed among the first and third MEMS circuits, and a third signal pair may be distributed among the second and third MEMS circuits.

Also in a general sense (not shown), it is not essential that every signal pair be distributed into separate MEMS circuits.

However, the most efficient configuration (quickest switching times and lowest insertion loss) occurs as shown in FIG. 12, wherein: all signal pairs are distributed among just two separate MEMS circuits; any non-paired signals are distributed among these same two separate MEMS circuits C34 and C36; and the SOI circuit C16 is a SP2T.

FIG. 13 illustrates a timing chart for a MEMS switch in series with an SOI switch. The FIG. 13 timing chart corresponds to the signal pairs of FIG. 2 (excluding TRX B7, RX B7 Div, and GND).

MEMS Tx Branches correspond to M2, M3, and M4 of FIG. 2, and the MEMS Rx branches correspond to M6, M7, and M8 of FIG. 2. Specifically, MEMS MTx1 and MRx2 correspond to a first signal pair (e.g. TX B40 and RX B40 respectively) and MTx2 and MRx1 correspond to a second signal pair (e.g. TX B41 and RX B41 respectively)

The SOI switches STx ON and SRx OFF correspond to the UP position of the SP2T in SOI circuit C16, and antenna ANT corresponds to antenna A1.

FIG. 13 shows the anticipated timing of the MEMS and SOI switches arranged in series and how the cycle count is reduced, switching time demands diminish, and hot switching protection is provided.

Specifically, during period 1, MTx1, a first transmit signal (e.g. TX B40) is transmitted to the antenna ANT.

During period 2, the paired receive signal (e.g. RX B40) is received by the antenna and passed through MRx2 to the appropriate node.

During period 3, the receiving branches are isolated (STx ON closed and SRx OFF open), then MRx2 is OFF (opened), then MRx1 is ON (closed). Thus, RXB40 is turned OFF and RXB41 is turned ON (while the Rx branches are isolated).

During period 4, the transmitting branches are isolated (STx OFF and SRX ON), then TX B40 is turned OFF, then TX B41 is turned ON (while the Tx branches are isolated). At this time, the circuit C8 may receive RX B41.

During period 5 (STx ON and SRx OFF), the circuit C8 may transmit TX B41 through MTx2 to the antenna ANT.

During period 6, (Stx OFF and SRx ON), the circuit C8 may receive TX B41 through MRx1. These 6 periods complete a full transmit/receive cycle at Band 40, a full transition to Band 41, and a full transmit/receive cycle at Band 41.

These periods are illustrative only. For example, the cycles in a band may begin with receive (instead of with transmit). A full cycle is not required.

Additionally, the SOI switching may be much faster than the MEMS switching, so the periods of the SOI switching may be very fast (very short) during transmit/receive cycles, but may become much longer (relatively) to facilitate the relatively slow MEMS switching required while changing bands.

Figure 14:
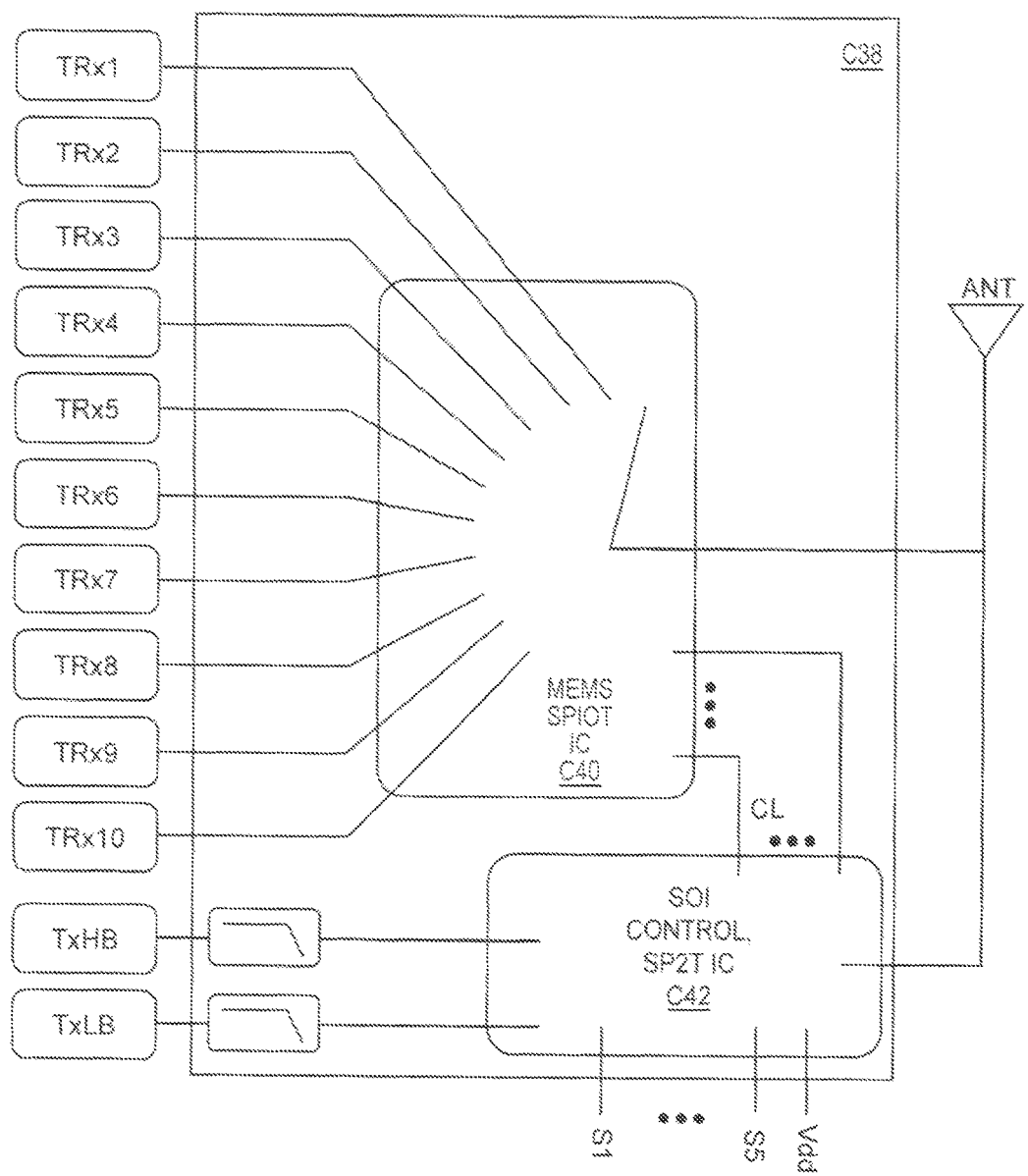
FIG. 14 illustrates a MEMS switch in parallel with an SOI switch.

FIG. 14 illustrates a MEMS switch in parallel with an SOI switch.

As shown in FIG. 14, the SOI switch bC42 is configured in parallel with MEMS switch C40 to form circuitry C38. Branches operating in TDD mode or 2G mode which require fast and frequent switching can be switched by an SOI switch, and slower and less frequent switching can be switched by a MEMS switch.

As shown, SOI circuit C42 includes an SP2T SOI switch, as well as high voltage generation and control and pilot switching portions.

This parallel configuration of circuitry C38 is particularly useful when a majority of the switching occurs from TxHB to TxLB, and when the other nodes (TRx1 through TRx10) are rarely used.

Thus, the high speed switching (but high insertion loss) SOI is strictly limited to those nodes that are frequently switched.

This parallel configuration may reduce the cycle count required as per the previous embodiments (~100×), and also potentially the time required for switching. Hot switching and ESD solutions will still be required and may be achieved by the use of an SOI pilot switch as described above.

Figure 15:
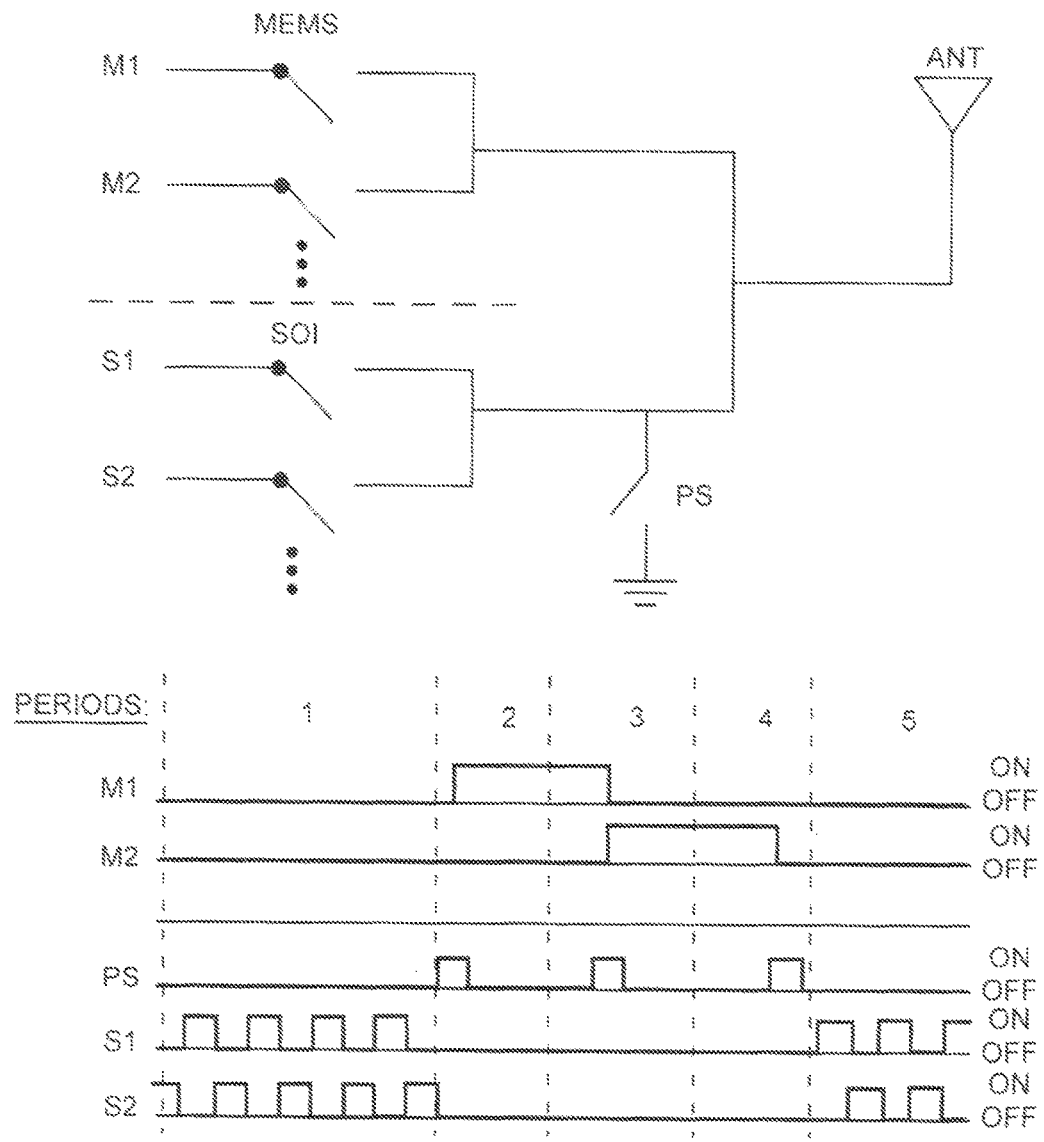
FIG. 15 illustrates a timing chart for a MEMS switch in parallel with an SOI switch.

FIG. 15 illustrates a timing chart for a MEMS switch in parallel with an SOI switch. Specifically, FIG. 15 shows the timing of MEMS and SOI switches arranged in parallel, and how the cycle count is reduced and hot switching protection is provided.

As shown in FIG. 15, the MEMS switches M1 and M2 respectively correspond to TRx1 and TRx2 branches of MEMS circuit C40 in FIG. 14. The SOI switches S1 and S2 respectively correspond to the TxHB and TxLB branches of SOI circuit C42. A pilot switch PS is also shown in FIG. 15 (not shown in FIG. 14) and is connected to antenna ANT.

In period 1, SOI circuit C42 (switches S1 and S2) cycles rapidly between TxHB and TxLB.

In period 2, the pilot switch PS switches ON (grounding the antenna ANT to reduce incident power during MEMS switching), then M1 switches ON, then PS switches OFF, and then TRx1 transmits through M1.

In period 3, the pilot switch PS switches ON (grounding the antenna ANT to reduce incident power during MEMS switching), then MEMS M1 turns OFF and M2 turns ON, then PS switches OFF, then TRx2 transmits through M2.

In period 4, the PS switches ON, then M2 turns OFF, then PS switches OFF, and circuitry C38 is ready for high speed SOI switching (all MEMS switches are OFF).

In period 5, SOI circuit C42 (switches S1 and S2) cycles rapidly between TxHB and TxLB.

In its most general form, the concept of FIGS. 14 and 15 is to have a parallel combination of a SOI circuit and a MEMS circuit, and to have each signal routed through the circuit that is most appropriate. For one example, associate (or direct) signals requiring high switching frequencies to SOI circuit C42, and associate the remaining signals to MEMS circuit C40.

The number of throw counts, and inclusion (or not) of voltage generation, control, and pilot switches capabilities in the COI circuit are all considered to be within the scope of the present disclosure.

Figure 16:
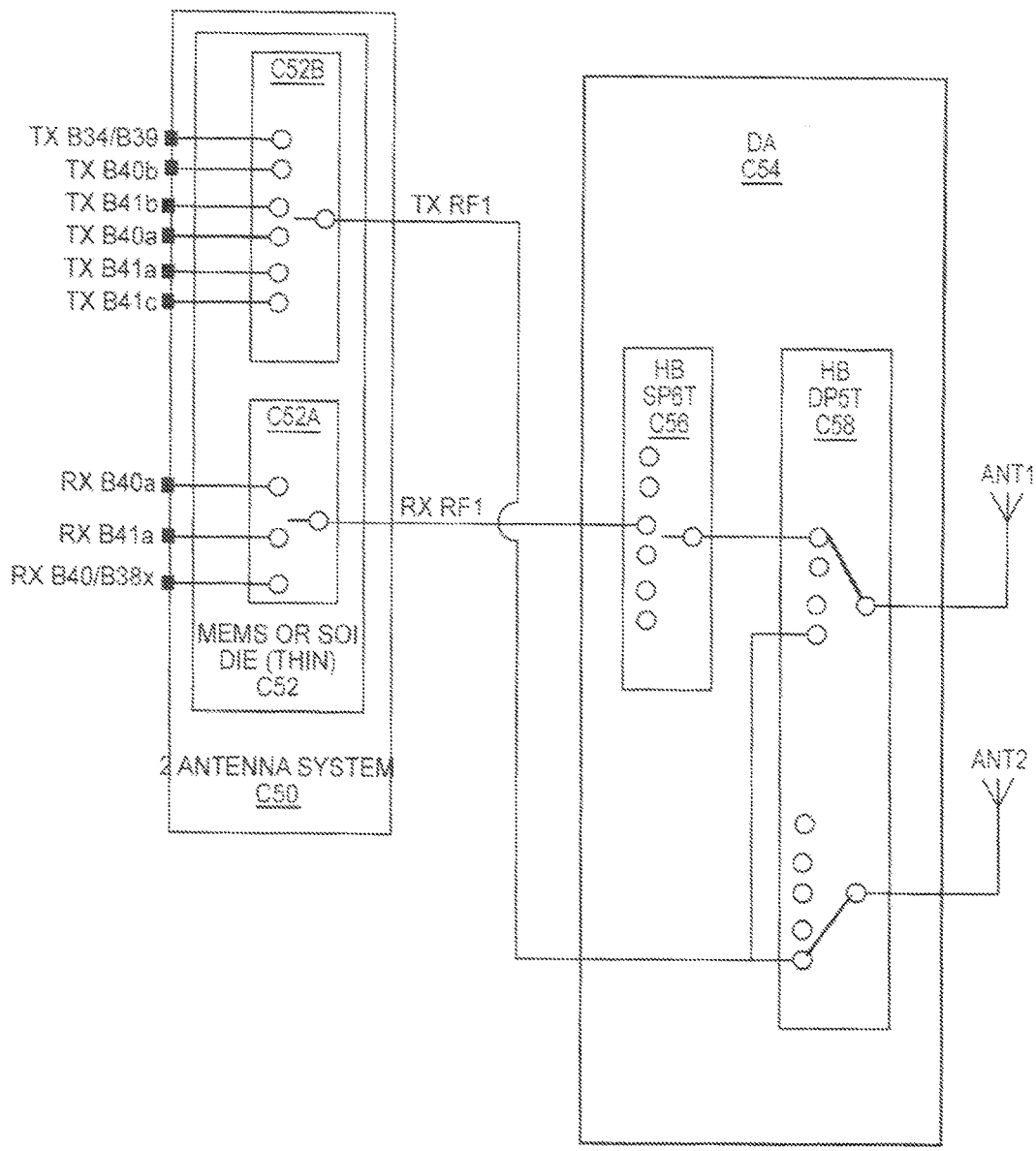
FIG. 16 illustrates a MEMS circuit in series with a complex SOI circuit.

FIG. 16 illustrates a MEMS circuit C50 in series with a complex SOI circuit C54.

In FIG. 16, MEMS circuit C50 includes a MEMS die C42. The MEMS die C42 includes a receiving MEMS circuit C52A (configured to receive a reception signal RxRF1) and a transmission MEMS circuit C52B (configured to outputting a transmission signal TxRF1). In this embodiment, C52B is a SP6T, and C52A a SP3T (including one signal from each of three signal pairs). There are signal pairs in bands B40a, B41a, and B40/B38x.

Complex SOI circuit C54 is configured to receive a signal from antenna ANT1, then route this received signal (RxRF1) through high band SOI DP5T circuit C58, then through high band SOI SP6T circuit C56, and then to receiving MEMS circuit C52A for additional routing to the appropriate node (RxB40a, RxB41a, or RxB40/38x).

Transmissions from SOI circuit C52B are TxRF1, and are routed directly to SOI circuit C58 (and then, for example, to antenna ANT2). The double pole (DP5T) nature of circuit C58 allows antenna ANT1 (connected to a first pole of the double pole) to receive while antenna ANT2 (connected to a second pole of the double pole) transmits.

In view of the previous timing diagrams, many additional different timing diagrams (not shown) are inherently disclosed by FIG. 16.

Those skilled in the art will recognize improvements and modifications to the preferred embodiments of the present disclosure. All such improvements and modifications are considered within the scope of the concepts disclosed herein and the claims that follow.

What is claimed is:

1. Optimized switching circuitry comprising:
   Microelectromechanical systems (MEMS) circuitry including a single pole N throw (SPNT) MEMS switch, wherein N is a finite positive integer and the SPNT MEMS switch is configured to select one out of at least two signal nodes, and to route the selected signal node to an antenna; and
   solid state circuitry in parallel with the MEMS circuitry, wherein the solid state circuitry includes a single pole M throw (SPMT) solid state switch, wherein M is a finite positive integer, and wherein the SPMT solid state switch is configured to select one out of at least two additional signal nodes, and to route the selected additional signal node to the antenna.

2. The optimized switching circuitry of claim 1 wherein the solid state circuitry includes a controller configured to control the SPNT MEMS switch and the SPMT solid state switch.

3. The optimized switching circuitry of claim 2 wherein the controller controls the SPNT MEMS switch via control lines.

4. The optimized switching circuitry of claim 2 further comprising:
   a pilot switch configured to ground the antenna upon receiving a command from the controller.

5. The optimized switching circuitry of claim 4 wherein the controller is configured to control the SPNT MEMS switch, the SPMT solid state switch, and the pilot switch by causing the following steps to be performed:
   during a first period: switch the solid state circuitry to select a first solid state signal node, then switch the solid state circuitry to deselect the first solid state signal node and to select a second solid state signal node;
   during a second period: switch the pilot switch to ground the antenna, then switch the MEMS circuitry to select the first MEMS signal node, then switch the pilot switch to isolate the antenna from a ground;
   during a third period: switch the pilot switch to ground the antenna, then switch the MEMS circuitry to deselect a first MEMS signal node and to select a second MEMS signal node, then switch the pilot switch to isolate the antenna from the ground;
   during a fourth period: switch the pilot switch to ground the antenna, then switch the MEMS circuitry to deselect the second MEMS signal node, then switch the pilot switch to isolate the antenna from the ground; and
   during a fifth period: switch the solid state circuitry to select the first solid state signal node, then switch the solid state circuitry to deselect the first solid state signal node and to select the second solid state signal node.

6. The optimized switching circuitry of claim 1 wherein the solid state circuitry includes SOI (Silicon-On-Insulator) circuitry.

7. The optimized switching circuitry of claim 6 wherein the SOI circuitry is configured to switch between a transmit mode and a receive mode in about 5 μS.

8. The optimized switching circuitry of claim 1, wherein the MEMS switch opens and closes over a time period having a duration between 20 μS and 40 μS.

9. The optimized switching circuitry of claim 1 wherein the solid state circuitry includes silicon-on-sapphire (SOS) circuitry.

10. The optimized switching circuitry of claim 1 wherein the solid state circuitry includes pseudomorphic high electron mobility transistor (PHMET) circuitry.

11. The optimized switching circuitry of claim 1 wherein the MEMS circuitry includes a first MEMS circuit in parallel with and separate from a second MEMS circuit.

12. The optimized switching circuitry of claim 11 wherein the first MEMS circuit is configured to switch a transmit signal and the second MEMS circuit is configured to switch a receive signal.

13. The optimized switching circuitry of claim 12 wherein the transmit signal and the receive signal are within a same band and are routed on separate paths by way of the first MEMS circuit and the second MEMS circuit.

14. The optimized switching circuitry of claim 11 wherein the solid state circuitry is configured to switch between the first MEMS circuit and the second MEMS circuit without requiring switching within the first MEMS circuit and the second MEMS circuit.

15. The optimized switching circuitry of claim 2 wherein the controller is configured to switch the MEMS circuitry at least one hundred times less frequently than the solid state circuitry.

16. The optimized switching circuitry of claim 1 further including a bidirectional coupler configured to measure power going to and coming from the antenna.

17. The optimized switching circuitry of claim 16 wherein the solid state circuitry is configured to transfer measurements from the bidirectional coupler through the solid state circuitry.

18. The optimized switching circuitry of claim 1 wherein the MEMS circuitry and the solid state circuitry in parallel with the MEMS circuitry receive control signals over a serial bus.

19. The optimized switching circuitry of claim 1 wherein the MEMS circuitry is configured to switch RF signals to and from additional antennas.

20. The optimized switching circuitry of claim 19 wherein the solid state circuitry is configured to switch the RF signals to and from at least one antenna.

* * * * *

UNITED STATES PATENT AND TRADEMARK OFFICE
CERTIFICATE OF CORRECTION

PATENT NO. : 9,991,065 B2
APPLICATION NO. : 15/282119
DATED : June 5, 2018
INVENTOR(S) : Nadim Khlat and Jonathan Hale Hammond Page 1 of 1

It is certified that error appears in the above-identified patent and that said Letters Patent is hereby corrected as shown below:

In the Specification

In Column 8, Line 30, replace "series with SOD" with --series with SOI)--.

Signed and Sealed this
Twenty-fourth Day of July, 2018

Andrei Iancu
*Director of the United States Patent and Trademark Office*